United States Patent
Morsy et al.

(10) Patent No.: US 11,216,244 B2
(45) Date of Patent: Jan. 4, 2022

(54) METHOD AND DEVICE FOR PROCESSING, PLAYING AND/OR VISUALIZING AUDIO DATA, PREFERABLY BASED ON AI, IN PARTICULAR DECOMPOSING AND RECOMBINING OF AUDIO DATA IN REAL-TIME

(71) Applicant: ALGORIDDIM GMBH, Munich (DE)

(72) Inventors: Kariem Morsy, Munich (DE);
Federico Tessmann, Munich (DE);
Christoph Teschner, Munich (DE)

(73) Assignee: ALGORIDDIM GMBH, Munich (DE)

( * ) Notice: Subject to any disclaimer, the term of this patent is extended or adjusted under 35 U.S.C. 154(b) by 0 days.

(21) Appl. No.: 16/892,063

(22) Filed: Jun. 3, 2020

(65) Prior Publication Data
US 2021/0279030 A1 Sep. 9, 2021

Related U.S. Application Data

(63) Continuation of application No. PCT/EP2020/056124, filed on Mar. 6, 2020.

(51) Int. Cl.
*G06F 3/16* (2006.01)
*H04R 3/12* (2006.01)
*H04N 21/439* (2011.01)
*G11B 27/10* (2006.01)
*G11B 20/10* (2006.01)

(52) U.S. Cl.
CPC ........ *G06F 3/165* (2013.01); *G11B 20/10527* (2013.01); *G11B 27/105* (2013.01); *H04N 21/439* (2013.01); *H04R 3/12* (2013.01); *H04R 2227/003* (2013.01); *H04R 2227/005* (2013.01)

(58) Field of Classification Search
CPC . G06F 3/165; G11B 20/10527; G11B 27/105; H04N 21/439; H04R 3/12; H04R 2227/003; H04R 2227/005
See application file for complete search history.

(56) References Cited

U.S. PATENT DOCUMENTS

| | | | |
|---|---|---|---|
| 2008/0013757 A1* | 1/2008 | Carrier | G06F 17/00 381/119 |
| 2012/0210230 A1* | 8/2012 | Matsuda | G11B 27/034 715/723 |
| 2018/0122403 A1* | 5/2018 | Koretzky | G10L 21/028 |
| 2020/0043517 A1* | 2/2020 | Jansson | G10L 15/16 |

* cited by examiner

*Primary Examiner* — Fan S Tsang
*Assistant Examiner* — David Siegel
(74) *Attorney, Agent, or Firm* — Kilpatrick Townsend & Stockton LLP

(57) ABSTRACT

The present invention relates to a method for processing and playing audio data comprising the steps of receiving mixed input data and playing recombined output data. Furthermore, the invention relates to a device for processing and playing audio data, preferably DJ equipment, comprising an audio input unit for receiving a mixed input signal, a recombination unit and a playing unit for playing recombined output data. In addition, the present invention relates to a method and a device for representing audio data, i.e. on a display.

32 Claims, 11 Drawing Sheets

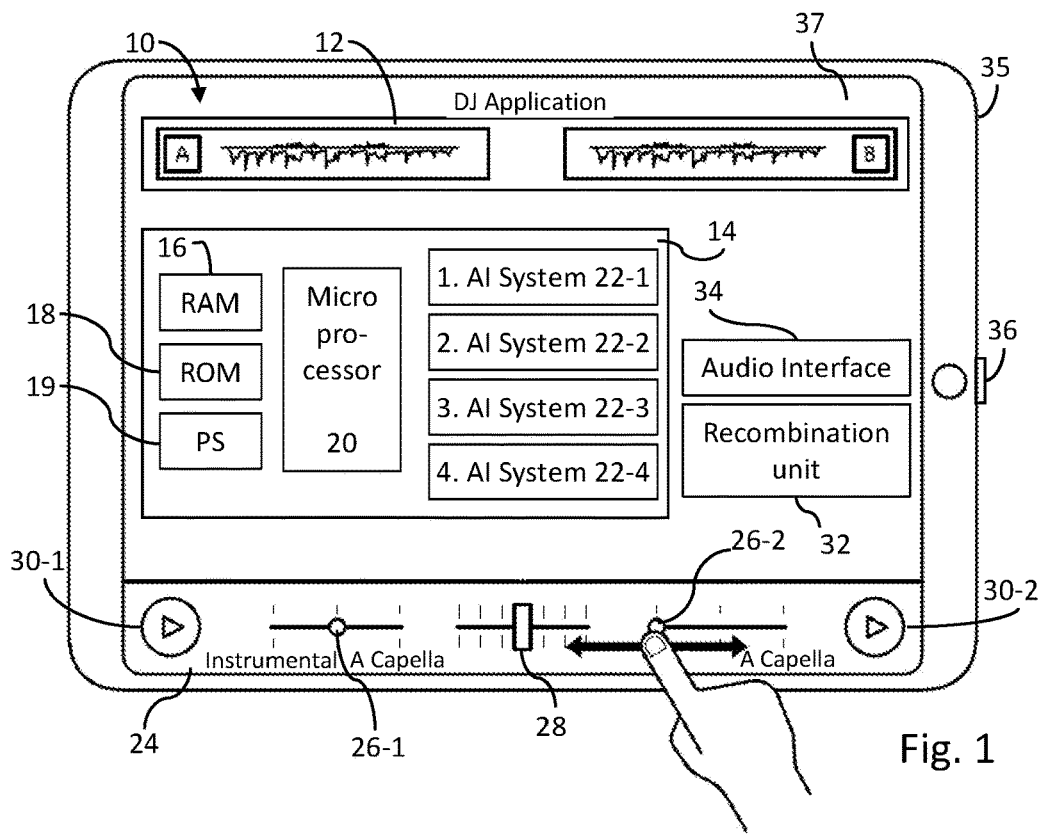
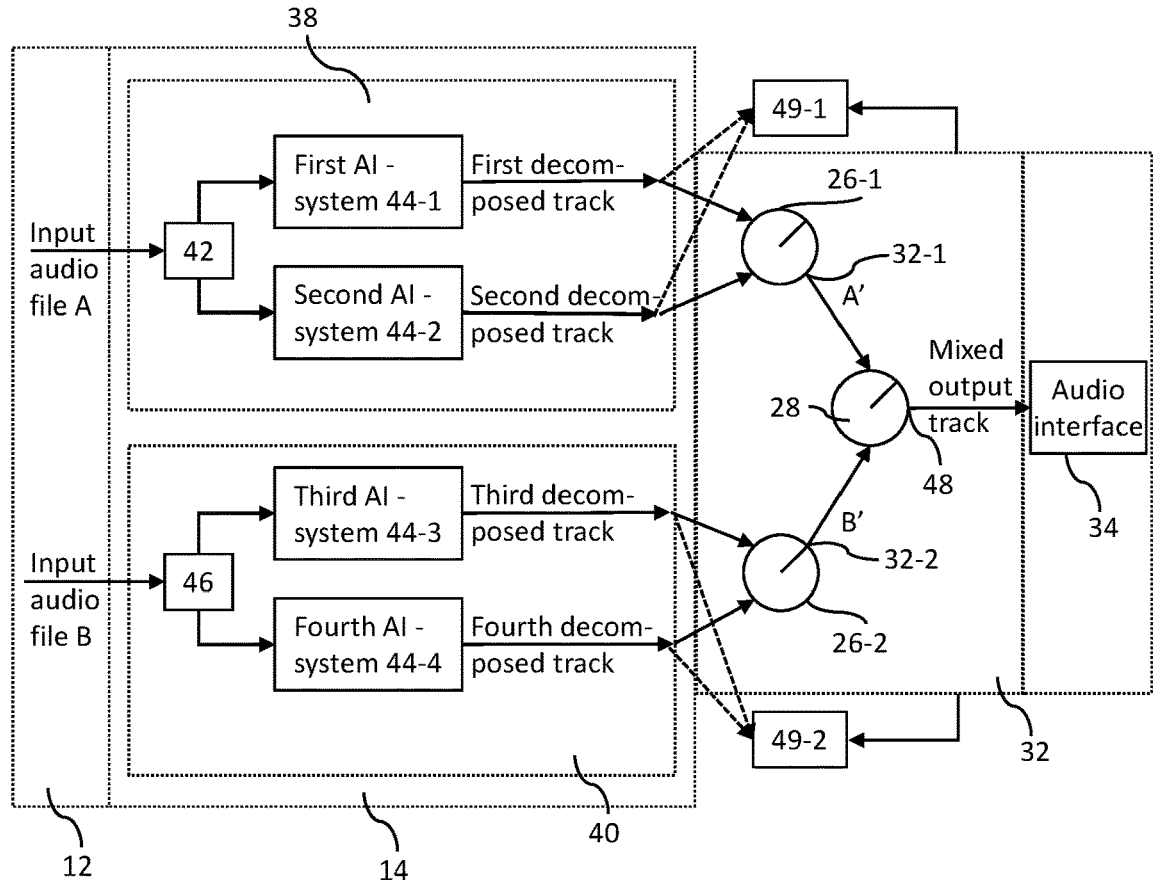
Fig. 1
Fig. 2

METHOD AND DEVICE FOR PROCESSING, PLAYING AND/OR VISUALIZING AUDIO DATA, PREFERABLY BASED ON AI, IN PARTICULAR DECOMPOSING AND RECOMBINING OF AUDIO DATA IN REAL-TIME

CROSS REFERENCE TO RELATED APPLICATION

This application claims priority to International Patent Application No. PCT/EP2020/056124, filed on Mar. 6, 2020, the entire contents of which are hereby incorporated herein by this reference.

The present invention relates to a method for processing and playing audio data comprising the steps of receiving mixed input data and playing recombined output data. Furthermore, the invention relates to a device for processing and playing audio data, preferably DJ equipment, comprising an audio input unit for receiving a mixed input signal, a recombination unit and a playing unit for playing output data. In addition, the present invention relates to a method and a device for representing audio data, i.e. on a display.

Audio equipment of the above-mentioned characteristics is used in various applications in which audio data is played, processed, transmitted or recorded. In particular, methods and devices of such type are used in the field of music entertainment and may be implemented in sound systems for live entertainment and public address systems (PA systems). One example is DJ equipment which is conventionally adapted to receive at least two different input signals and comprises a recombination unit for mixing the two input signals at desired volume levels. DJ devices usually include a control element called crossfader for increasing the volume level of the first input signal while at the same time decreasing the volume level of the second input signal such as to continuously blend between the input signals.

In recent years, the creative and artistic contribution of disc jockeys during live shows has had a significant impact not only on the overall entertainment quality at a particular venue, but also on the development of modern music as such. Certain audio effects, timing and pitch variations developed by influential DJs have been used in modern arrangements of conventionally produced recordings. Accordingly, there is a strong desire in the field to explore new techniques for live modification of existing audio signals in order to further increase the creative freedom for the DJ during the show.

Besides the creative aspects of DJ work, it is a major task of a DJ to seamlessly blend between two songs. For this purpose, conventional DJ equipment provides features for changing tempo and key of a song such as to match tempo and key of the other song, respectively, and provides controls for cross-fading volumes or parameters of audio effects, for example equalizer effects, of the two songs. In order to achieve a smooth transition, it is an aim of the DJ to avoid clashing of the vocals of the two songs. Therefore, the transition is usually made during a time interval in which at least one of the two songs has a pause in the vocal track, for example during an instrumental solo part, an outro part or during a break between chorus and verse or at similar positions. However, this is a considerable restraint for the DJ and requires good knowledge or analysis of the song material during mixing. Furthermore, in many songs, especially in the genre of Pop or Hip Hop, often there is virtually no break in the vocal track that would be large enough for the DJ to allow a smooth transition to the other song. For such songs, a clashing of two vocals playing together or some interruption in the flow can sometimes not be avoided with the conventional techniques.

As regards the audio sources, in particular the input data available to the DJ, conventional methods and devices are usually confined to processing mixed input signals such as mixed stereo audio files obtained from online digital music stores or streaming services. Audio files are usually produced in a music studio by mixing a plurality of source tracks, for example a plurality of vocal and instrumental tracks, applying audio effects and mastering the project to obtain a stereo audio file. As the finished audio file is a sum signal of all source tracks and effects etc., information about individual source tracks is usually lost and not available any more from a direct inspection of the audio file alone.

In recent years, there have been several approaches based on artificial intelligence and deep neural networks in order to decompose mixed audio signals to separate a vocal part of the signal. Some AI systems usually implement a convolutional neural network (CNN), which has been trained by a plurality of data sets including a vocal track, an instrumental track and a mix of the vocal track and the instrumental track. Examples for such conventional AI systems capable of separating source tracks such as a singing voice track from a mixed audio signal include: Prétet, "Singing Voice Separation: A study on training data", Acoustics, Speech and Signal Processing (ICASSP), 2019, pages 506-510; "spleeter"—an open-source tool provided by the music streaming company Deezer based on the teaching of Prétet above, "PhonicMind" (https://phonicmind.com)—a voice and source separator based on deep neural networks, "Open-Unmix"—a music source separator based on deep neural networks in the frequency domain, or "Demucs" by Facebook AI Research—a music source separator based on deep neural networks in the waveform domain. These tools accept music files in standard formats (for example MP3, WAV, AIFF) and decompose the whole song to provide decomposed/separated tracks of the song, for example a vocal track, a bass track, a drum track, an accompaniment track or any mixture thereof. The tracks may then be stored by the user for audio production, analysis purposes or playback. For example, the conventional AI systems may be used to set up a karaoke machine by removing vocal tracks from commercially available songs.

Although one could think about loading source tracks as input files into a DJ system to allow recombining these tracks during a live show, such approaches did not become popular among DJs for several reasons.

First, individual source tracks, such as original voice tracks, of commercially released music are usually not available separately, as record labels or producers usually only provide complete mixed audio files. Second, in the case of streaming music where audio data needs to be processed and played on the fly, it would usually not be possible to download the entire audio content upfront and pre-preprocess it prior to playback with a software module such as one of the tools mentioned above.

Third, decomposition of audio files having a typical playback duration of a couple of minutes or more involves complex calculations which are relatively time consuming, especially when using a neural network, such that extensive time and work is required to prepare the setup before a show, i.e. to upload, decompose, download, store and organize all the tracks that are possibly desired to be used during the show. In general, decomposition using neural networks is known to achieve good quality and precise separation of tracks but it takes relatively long time to decompose an audio file of usual size (playback duration of a few minutes). On the other hand decomposition without neural networks, for example based on simple digital signal processing such as subtracting the left from the right channel in a stereo audio file, also known as phase cancellation (grounded on the assumption that many vocal source tracks are recorded in mono and are equally applied on both stereo channels), is known to be quick and with regards to processing time may be suitable for use under live circumstances, however these approaches provide low quality and usually do not yield the expected results. Fourth, DJ systems allowing playback of separated tracks require multichannel mixing units having separate faders for adjusting the volume of each track. Such additional faders are difficult to operate simultaneously for the DJ and increase the complexity of the system.

In view of the above background, it is an object of the present invention to provide a method and a device for processing and playing audio data which increase the artistic and creative freedom of a user to control the playback of audio data, preferably under the circumstances of a live show.

According to a first aspect of the present invention, the above object is achieved by a method for processing and playing audio data, comprising the steps of (a) receiving mixed input data, said mixed input data being a sum signal obtained from mixing at least one first source track with at least one second source track, (b) decomposing the mixed input data to obtain at least a first decomposed track resembling the at least one first source track, (c) generating output data based on the first decomposed track, and (d) playing the output data through an audio output.

In the context of the present disclosure, mixed input data are representative of an audio signal obtained from mixing a plurality of source tracks, in particular during music production. Thus, mixed input data are obtained from a previous mixing process that has been completed before the start of the processing according to the method of the present invention. In other words, the methods of the invention is using input data from a previous mix down process, separate from the processing of the present invention. In particular, the mixed input data may be audio files, for example audio files containing a piece of music that has been produced in a recording studio by mixing a plurality of source tracks. For example, a first source track may be a vocal track obtained from recording a vocalist via a microphone, while a second source track may be an instrumental track obtained from recording an instrumentalist via a microphone or a direct line signal from the instrument. Usually, a plurality of vocal tracks and/or a plurality of instrumental tracks are recorded at the same time or one after another. The plurality of source tracks are then transferred to a mixing station in which the source tracks are individually edited, various sound effects are applied to the source tracks, individual volume levels are assigned and preferably one or more mastering effects are eventually applied to the sum of all tracks. At the end of the production process, the final audio mix is stored on a suitable recording medium, for example in an audio file on the hard drive of a computer. Such audio files preferably have a conventional audio file format such as MP3, WAV, AIFF or other, in order to be readable by standard playback devices, such as computers or smartphones running an Apple mobile operating system (iOS), an Apple Macintosh operating system (macOS), a Microsoft Windows operating system or a Google Android operating system etc.

In embodiments of the present invention, mixed input data are preferably audio files, especially audio files containing music. Methods or devices of the present invention are preferably configured to store such audio files onto local storage means of the device, and/or to receive, especially to stream, such audio files from a remote server, for example via internet. Devices of the present invention may therefore comprise network connectivity means, such as a WIFI interface or a LAN interface, configured to receive the audio files. Alternatively or in addition, the devices may have any other connectivity, such as a Bluetooth interface or a USB port, adapted to receive audio files. The device may have a hard drive to store audio data.

According to an embodiment of the present invention, the steps of receiving mixed input data, decomposing the mixed input data, generating and playing output data are carried out in a continuous process. This means that processing of the audio data from input (receiving mixed input data) to output (playing output data) is carried out continuously, or on the fly, i.e. without substantial time delay. For example playback of decomposed audio data can be started within a time period smaller than 2 seconds, preferably smaller than 150 milliseconds, most preferably smaller than 50 milliseconds, from the receipt of the mixed input data. In particular, it is not necessary to upload audio files to a remote server of a decomposition service provider, wait for the decomposition to be finished on the remote server and download the decomposed track from the server to a local device, store the decomposed track on a local memory and then play the decomposed track. The continuous processing may be realized by carrying out all steps of the process, i.e. receiving mixed input data, decomposing the mixed input data, generating and playing output data within a single device or within a plurality of local devices all connected to one another by cables and/or in a local network and/or via near-field-wireless connections (WIFI, Bluetooth, IR etc.). In addition or alternatively, the continuous processing including the steps of receiving mixed input data, decomposing the mixed input data, generating and playing output data may be implemented within a single software application (single software program or app), adapted to be run on an electronic control unit (ECU) such as a computer, a tablet, a smartphone, a standalone DJ hardware console etc.

According to the method of the present invention, mixed input data of the above-described type are received and decomposed such as to obtain a first decomposed track that resembles a first source track or a sum of first source tracks. Optionally a second decomposed track may be obtained during decomposition that resembles a second source track or a sum of second source tracks. For example, the first decomposed track may resemble an original voice track or the sum signal of a plurality of voice tracks, for example the sum of original voice tracks from each vocalist of a choir or the sum signal of two or more voice tracks from a doubled vocal track. Likewise, the second decomposed track may resemble an original instrumental track such as a single recorded or produced instrumental track or a sum signal of multiple instrumental tracks such as the sum signal of all instrumental tracks. In a preferred embodiment, the first decomposed track resembles the main vocal track or the sum of all main vocal tracks in isolation, whereas the second decomposed track resembles the remainder of the mix, i.e. the sum of all tracks except for the main vocal track/tracks.

The quality of decomposition results, i.e. how closely a decomposed track resembles a corresponding source track, can be assessed by using for example the MUSDB18 dataset (Zafar Rafii, Antoine Liutkus, Fabian-Robert Stöter, Stylianos Ioannis Mimilakis, and Rachel Bittner. The musdb18 corpus for music separation, 2017) which serves as the standard benchmark and reference database for the evaluation of decomposition algorithms. Experiments on the MUSDB18 dataset typically measure the signal to distortion ratio (SDR) among other measures as well as human evaluations as assessed by mean opinion score (MOS) on perceived quality of the decomposition results.

State-of-the-art SDR scores are greater than 5.0, some are even greater than 7.0 (Défossez, A., Usunier, N., Bottou, L., & Bach, F. (2019). Music Source Separation in the Waveform Domain. arXiv preprint arXiv:1911.13254.)

As regards human evaluation for example 2 ratings may be provided on a scale from 1 to 5: first the quality and absence of artifacts (1: many artifacts and distortion, content is hardly recognizable, 5: perfect quality, no artifacts) and second the contamination by other source tracks (1: contamination if frequent and loud, 5: no contamination). State-of-the-art human evaluation ratings are greater than 3.0, or even greater than 4.0. Preferably, in embodiments of the present invention, in a step of decomposing a mixed track obtained from mixing at least a first source track with at least a second source, to achieve a decomposed track, the decomposed track resembles the first source track with a MOS score of greater than 2.0, preferably greater than 4.0, and/or with a SDR score of greater than 3.0 dB, preferably greater than 5.0 dB.

In an embodiment of the invention, there may be provided a second track and the method may further comprise the following steps, preferably carried out in the continuous process: reading a control input from a user, said control input representing a desired setting of a first volume level of the first decomposed track and a second volume level of the second track, recombining at least the first decomposed track at the first volume level with the second track at the second volume level to generate recombined output data, and playing the recombined output data. The second track may be an independent track obtained from second mixed input data (for example a second song) or may be obtained in the step of decomposing the mixed input data and thus may form a second decomposed track resembling the at least one second source track of the mixed input data.

In the context of the present disclosure, recombining a first track with a second track can be achieved in any manner known as such, for example by a recombination processing comprising a first step of scaling the tracks based on their respective volume levels (for example multiplying the signal values of the first and second tracks by their respective first and second volume levels, or using any suitable amplifying unit which amplifies the first and second tracks according to their first and second volume levels), and a second step of mixing the scaled/amplified tracks in a software or hardware mixer (for example by summing the signal values of the scaled/amplified tracks at equal or corresponding time frames).

In particular, according to an embodiment of the present invention there is provided a method for processing and playing audio data, comprising the steps of receiving mixed input data, said mixed input data being a sum signal obtained from mixing at least one first source track, for example a vocal track, and at least one second source track, for example an instrumental track, decomposing the mixed input data to obtain at least a first decomposed track resembling the at least one first source track, and a second decomposed track resembling the at least one second source track, reading a control input from a user, said control input representing a desired setting of a first volume level of the first decomposed track and a second volume level of the second decomposed track, recombining at least the first decomposed track at the first volume level with the second decomposed track at the second volume level to generate recombined output data, and playing the recombined output data.

Using a second track according to any of the above-described embodiments is particularly suitable for live applications in order to create and immediately play novel recombinations, e.g. remixes or mashups, based on the first decomposed track and another track. Preferably, in the present invention the method allows a user to control the volume levels of the first and second decomposed tracks and recombine the first and second decomposed tracks at the specified volume levels such as to play the recombined output signal obtained from recombining of the first and second decomposed tracks. Specifically, this allows a DJ to make seamless transitions between songs, in particular to avoid overlapping vocal playback during a transition. Even during a time interval of the playback where both songs contain vocal parts, the user may seamlessly blend between the songs, for example by simply fading out the volume of one of the vocals such as to provide space to fade in the vocals of the other song. At any time before, after or during the vocal transition, the user may perform a transition from the instrumental track of the first song to the instrumental track of the second song.

Another advantage achieved by a method of the invention is that a user is able to access individual components of an audio mix in order to be able to recombine these components in a modified manner to create a so-called mashup or remix. This provides a number of new options for the creative or artistic work of the user when playing audio such as during a live show. For example, the user can use the control input to manipulate a volume ratio between a decomposed vocal track and a decomposed instrumental track while playing the recombined output data, for example swipe between vocal and instrumental as desired, swap vocals of two songs, while maintaining instrumentals or vice versa as will be discussed in more detail later.

In a preferred embodiment of the invention, decomposing the mixed input data is carried out segment-wise, wherein decomposing and, if applicable, recombining are carried out based on a first segment of the mixed input data such as to obtain a first segment of output data, and wherein decomposing of a second segment of the mixed input data is carried out while playing the first segment of output data.

A segment-wise and parallel decomposition of mixed input data according to this embodiment drastically decreases the time required for performing the decomposition calculations and thus allows to start playback of the output data significantly earlier, preferably immediately, i.e. with no noticeable latency. In particular, it is not necessary to decompose the complete input data such as the complete audio file in order to obtain playable decomposed track data. Instead, it will be sufficient to finish decomposition of only one segment, or only some but not all of the segments of an audio file in order to be able to start playback, because parts of the decomposition calculations, in particular decomposition of other segments of the audio file, will be carried out during playback of previous segments.

Another technical effect of segment-wise decomposition is that it is more memory efficient and it will not be necessary to store all mixed input data, in particular the whole input audio file, at once within a local memory of the equipment (which may not even be possible nor desired for sources providing audio material intended for streaming usage, but not for download and/or permanent storage of the entire input audio file on a hard drive, for example). Instead, decomposition and recombining of the audio data can be carried out on the fly on the basis of a continuous stream of mixed input data, for example a continuous audio stream from a remote server, such as a streaming music service (Spotify, Apple Music etc.). Thus, the mixed input data may be received via streaming from a remote server, preferably through the internet.

Another advantage of segment-wise decomposition is that playback of the output data can be started at any desired position (at any desired playing time). In particular, the first segment, which is decomposed first, does not necessarily have to be the starting segment at the beginning of the audio file. In particular, it is not necessary to process and decompose the entire audio file, but instead decomposition can be started at the very segment that contains the desired playing position. Thus, it is possible to quickly and precisely jump forward and backward to arbitrary positions within an audio file with low or even without any recognizable delay, independent of the size and playback duration of the entire audio file.

According to a further embodiment of the present invention, a method of the above-described type can be provided, wherein in step (a) an input audio file having a predetermined file size and a predetermined playback duration is received, which contains audio data to play the mixed input data, and a first segment is extracted from the input audio file, which contains audio data to play the mixed input data within a first time interval smaller than the predetermined playback duration, wherein in step (b) the first segment of the input audio file is decomposed to obtain a first segment of the first decomposed track and optionally a first segment of the second decomposed track, wherein in step (c) a first segment of the output data is generated from the first segment of the first decomposed track, preferably by recombining at least the first segment of the first decomposed track at the first volume level with the first segment of the second decomposed track at the second volume level, and wherein the method further comprises the steps of: (a2) extracting a second segment from the input audio file, which is different from the first segment and which contains audio data to play the mixed input data within a second time interval smaller than the predetermined playback duration of the input audio file and shifted in time with respect to the first time interval, (b2) decomposing the second segment of the input audio file to obtain a second segment of the first decomposed track and optionally a second segment of the second decomposed track, optionally (c2) recombining at least the second segment of the first decomposed track at the first volume level with the second segment of the second decomposed track at the second volume level to generate a second segment of the output data, wherein at least one of the steps (a2), (b2) and (c2) is performed while playing the first segment of the output data, and wherein generation of the second segment of the output data is completed before playback of the first segment of the output data is completed.

In the present disclosure, the file size or size of audio data refer to the total number of frames of decoded and/or uncompressed data. Depending on the specific sampling rate of the audio data, a certain number of frames corresponds to a certain playback duration.

According to this embodiment, the mixed input data is an input audio file of a predetermined file size and predetermined playback duration. Such input audio file can be retrieved from a local storage device or can be streamed, for example from a remote server via internet etc. As described above, the input audio file (or an image/copy thereof), preferably a decoded version of the input audio file in case of using a compressed format as input, is virtually partitioned into at least two segments and further processing, in particular decomposing, is performed based on the segments. As soon as a segment is decomposed, the segments of the decomposed tracks can immediately be further processed, in particular recombined and played, while decomposing of the second segment can be commenced or continued. Since the size (in frames) and playback duration of the segments is usually smaller (preferably much smaller, for example less than 20 seconds playback duration) than the size and playback duration of the input audio file (usually several minutes), the time required for decomposing a segment is significantly smaller and playback of the corresponding segment of the output signal can be started earlier. Furthermore, during playback of a first segment of the output data, processing of a second segment of the input audio file, in particular decomposing the second segment to obtain a second segment of the first decomposed track and optionally the second decomposed track, can be carried out in parallel. Preferably, all segments have fixed equal size.

Preferably, the size of the individual segments into which the input audio file is partitioned is adapted to the processing time required for decomposing the individual segments such that generation of the second segment of the output data is completed before playback of the first segment of the output data is completed. As a result, playback of the whole output track, i.e. a continuous playback of all consecutive segments of the whole output track or of a part to be played, can be performed as soon as the processing/decomposition of the first segment is completed.

Preferably, the length of the first time interval is set such that the time required for decomposing the first segment is smaller than 2 seconds, such that the method can be used in a live situation for example by a DJ who may spontaneously decide to play one or more decomposed tracks to achieve specific effects. Furthermore, if the time required for decomposing the first segment is set to be smaller than 150 milliseconds, a playback of decomposed tracks can be triggered more precisely in time with a given beat such as to allow virtually real-time playback of any part of the audio file. Most preferably, the time required for decomposing the first segment is smaller than 50 milliseconds such that playback and beat/timing synchronization and position shifting within the audio file can be performed virtually latency-free which means that no recognizable time lag occurs. Under such conditions, the decomposed tracks of the audio file can be handled by the DJ in the same manner as original mixed audio files or conventional effect tracks etc.

In order for a person skilled in the art to find a suitable segment size, he/she could measure the time $t1$ required for a given hardware and software configuration to decompose audio data of a certain playback duration $T1$, then choose a desired decomposition time $t2$ according to the requirements as the time delay/latency that would be acceptable, and then obtain the playback duration $T2$ of the segment, for example from the equation $T2=T1*t2/t1$. Partitioning of the audio data may then be carried out into consecutive segments which each have a playback duration $T2$. If the segment size is chosen to be too small, the quality of decomposition will be lowered. If the segment size is chosen to be too large, processing time and thus latency is increased.

By using methods as described above, in particular methods which process segments of the input audio file to decrease processing time to a level suitable for a live performance it would in principle be possible to start playback of the decomposed tracks at any desired position (time position within the output track) by processing a segment of specified size which starts right at the desired playing position. This will in principle achieve acceptable results with regard to latency and audio quality and is usable for an application where the user just wants to jump to a certain position in the track to play the track from this position onwards, for example in a music player application. However, especially during creative DJ work it is sometimes desired to quickly and precisely perform small positional shifts, switching between forward or backward playback or changes in playing speed. For example during a technique called "scratching", the DJ quickly toggles between forward and backward playback at a certain position of the song to achieve the corresponding scratching audio effect resembling the effect achieved by quick forward and backward rotations of a playing vinyl record. The inventors of the present invention have found that application of such techniques to the output track obtained from decomposed tracks may result in audio artefacts and may not achieve the results as expected from applying the same technique to a corresponding source track or a corresponding conventional mixed track.

The inventors have found that this problem can be solved by an embodiment of the present invention, which comprises the steps of receiving an input audio file having a predetermined file size and a predetermined playback duration, which contains audio data to play the mixed input data, partitioning the input audio file into a plurality of segments in succession, which contain audio data to play the mixed input data within a plurality of time intervals following each other, receiving a play position command from a user representing a user's command to play the input audio file from a certain start play position, identifying a first segment out of the plurality of predetermined segments such that the start play position is within the time interval which corresponds to the first segment, decomposing the first segment of the input audio file (segment to be processed first, not necessarily starting segment of the input audio file) to obtain a first segment of the first decomposed track and optionally a first segment of the second decomposed track, generating a first segment of the output data based on the first segment of the first decomposed track, preferably by recombining at least the first segment of the first decomposed track at the first volume level with the first segment of the second decomposed track at the second volume level, and playing the first segment of the output data starting at the start play position, which is a play position later than or equal to the start of the time interval of the first segment of the output data. For clarity, the first segment is not necessarily the starting segment of the audio file, but a segment containing the desired start play position and therefore to be decomposed first in the process.

It is noted the segments in succession refers to segments, in particular fixed segments, chosen such that a starting position of a certain segment is later than the starting positions of all preceding segments.

According to this embodiment, decomposing of the input audio file is again performed in segments. However, the starting point of the first segment to be decomposed is not necessarily identical to a desired start play position chosen by the user as one could have thought to be the most time-effective way to define the segment as it contains the data to be played next, but instead fixed partitioning of the whole input audio file is set in the partitioning step, such that in each decomposing cycle for this input audio file the start points and end points of the segments will be maintained fixed. It has turned out that this technique greatly reduces or even completely avoids any sound artefacts at adjacent parts of consecutive segments in the decomposed track and the output data. If an AI system is used in the step of decomposing, one reason for the improvement could be that the decomposed audio signal at a specific audio position in the track depends on the data analyzed by the AI system before and after the specific audio position in the track, i.e. on the audio data between the start and end points of the respective segment that contains the specific position and is analyzed by the AI system. Having predefined segments with fixed start and end points throughout the input audio file ensures that the same decomposed audio data are always obtained from an analysis of the same piece of input audio data that lie within the same segments. For example, if a segment starts at position 15:00 (seconds:hundredth of one second) and has a playback duration of 5 seconds, then start play positions 15:30, 17:50 or 18:00 are all based on the identical decomposed segment only using a different position offset within the same decomposed segment.

In another preferred embodiment of the present invention, the mixed input data is first mixed input data being a sum signal obtained from mixing at least a first source track, for example a first vocal track, with a second source track, for example a first instrumental track or multiple instrumental tracks, and the method further comprises the step of receiving second mixed input data different from said first mixed input data, said second mixed input data being a sum signal obtained from mixing at least one third source track, for example a second vocal track different from the first vocal track, with at least one fourth source track, for example a second instrumental track different from the first instrumental track. Furthermore the method may comprise: decomposing the second mixed input data to obtain a third decomposed track resembling the at least one third source track, and a fourth decomposed track resembling the at least one fourth source track, wherein in the step of reading the control input from a user (e.g. received via one or more control elements), said control input represents a desired setting of the first volume level of the first decomposed track, the second volume level of the second decomposed track, a third volume level of the third decomposed track, and a fourth volume level of the fourth decomposed track, and wherein, in the step of recombining, the recombined output data is generated by recombining the first decomposed track at the first volume level, the second decomposed track at the second volume level, the third decomposed track at the third volume level and the fourth decomposed track at the fourth volume level.

Such embodiment can in particular be used in a DJ environment and can be implemented in DJ equipment where two different mixed input data such as two different audio files (e.g. two different songs) are played simultaneously at least for a certain amount of time. For example, during playback of a first song, the playback of a second song is started and the volume level of the first song is reduced to the benefit of the volume level of the second song, such as to smoothly blend over from the first to the second song. In the method of the embodiment described above, both first and second mixed input data may be decomposed into first and second decomposed tracks and third and fourth decomposed tracks, respectively, and the user may have an opportunity to recombine the decomposed tracks individually at the desired volume levels. As described above, such features may in particular be used by a DJ to smoothly blend between two songs while avoiding that the vocal tracks of different songs are audible at the same time. Moreover, as it will be possible according to such an embodiment to combine one of the decomposed tracks of the first mixed input data with one of the decomposed tracks of the second mixed input data, a sum signal or mashup/remix of components of the first and second mixed input data can be created that is completely novel and may therefore achieve surprising effects. For example, the decomposed vocal track of the first mixed input data could be recombined with the decomposed instrumental track of the second mixed input data to let the auditory hear the singer of one song being accompanied by the instrumentals of the other song.

Preferably, at least one or more, most preferably all of the mixed input data and of the decomposed track(s) are stereo data, each comprising a left channel signal portion and a right channel signal portion, respectively. Thus, the method is adapted to make use of the capabilities and acoustic effects of stereo audio. In other embodiments, mono data and mono tracks, or tracks having any other number of channels (e.g. 5.1 or 7.1 surround tracks or MP4 with multiple streams) could be used.

Decomposing the mixed input data to obtain the at least one decomposed track may be realized by any algorithm, filtering, effect application or other processing that is capable of separating at least one decomposed track (in particular a vocal track) from the mixed input data that is acoustically similar or equal to one or more source tracks of the original audio material that was mixed-down earlier to obtain the mixed input data. For example, decomposing may include calculation of a frequency spectrum, for example by using a Fourier transformation algorithm, filtering the frequency spectrum to extract frequencies belonging to a certain component of the mixed input data, in particular a vocal component, and retransforming the extracted frequencies, for example by using an inverse Fourier transformation, to obtain audio data of the first or second decomposed track.

In preferred embodiments of all aspects of the present invention, decomposing the mixed input data includes processing the mixed input data by an AI system (artificial intelligence system), said AI system preferably being based on at least one deep neural network, for example a convolutional neural network (CNN) and/or being trained by a plurality of sets of training audio data. Each set of training audio data may at least include a first source track, for example a vocal track, a mixed track being a sum signal obtained from mixing at least the first source track with a second source track, for example an instrumental track.

The use of an AI system allows high quality decomposing of the mixed input data such that the decomposition result very closely resembles original source tracks or sum signals of less than all original source tracks. For example resemblance with a MOS score of greater than 4.0, and/or with an SDR score of greater than 5.0 dB could be achieved by using an AI system. An AI system may be provided and trained by audio data obtained from one or more record labels and/or music production companies or one or more music distribution/streaming companies or a cooperation between them. For the purpose of training the AI system, the recording company may not only provide the mixed audio file of a certain recording but also one or more training source tracks which are included in the mixed track and which are obtained from the original material of the production process, i.e. the audio data of individual tracks or sums of less than all tracks used in the mixing process. After training the AI system with a large number of sets of training audio data, the AI system will be able to generate a decomposed track from a new mixed track (a new audio file) that has not been analyzed before during the training phase. For example, the AI system may be based on one of the above-mentioned conventional AI systems (e.g. spleeter, Open-Unmix, Demucs).

In embodiments of the present invention, at least one AI system, preferably multiple AI systems, may be fully stored and operating within a random access memory (RAM) of a device, such as to reduce the time required for decomposing the mixed input data and even allow nearly latency-free operation in a live situation, such as in a DJ device.

According to an embodiment of the present invention, an AI system as described above is used in the step of decomposing the mixed input data, wherein the invention, in an embodiment, proposes not only to extract a first decomposed track but also to extract a second decomposed track, such that a user can manipulate the volumes of the first as well as the second decomposed track individually and recombine both decomposed tracks for achieving a certain playback effect. Preferably, the second decomposed track is a complement of the first decomposed track which means that a sum of the first decomposed track and the second decomposed track closely resembles the entire audio signal of the mixed input data, except for the modified volume levels of the first and second decomposed tracks, and except for some deviations due to imperfections in the decomposing step (for example small signal components originating from the at least one first source track but being incorrectly identified by the AI system as originating from the at least one second source track or vice versa; other minor imperfections may result from the calculation processes, for example Fourier transformations, during the decomposing step).

In a preferred embodiment of the present invention, the mixed input data is simultaneously processed within a first AI system and a second AI system separate from the first AI system, wherein the first AI system processes the mixed input data to obtain only the first decomposed track and the second AI system processes the mixed input data to obtain only the second decomposed track. In particular, the method is preferably processing the mixed input data as first mixed input data and is further processing a second mixed input data simultaneously within a third AI system separate from the first and the second AI system, and within a fourth AI system separate from each of the first to third AI systems, wherein the third AI system processes the second mixed input data to obtain only the third decomposed track and the fourth AI system processes the second mixed input data to obtain only the fourth decomposed track. The use of at least two separate AI systems which are arranged to operate simultaneously allows the calculation of at least the first and second decomposed tracks in parallel, i.e. at the same time, such that the processing speed can be greatly improved and it will be possible to obtain the decomposed tracks with only small or even without recognizable time delay. If the method processes the first and the second mixed input data and thus four separate AI systems are used to be operable in parallel, fast decomposition of two separate audio files or segments thereof will be possible with only a small or even non-recognizable time delay. Such a method is therefore suitable for live performances such as by a DJ during a live show.

In a further embodiment of the invention, said mixed input data are first mixed input data based on a periodic beat structure (for example a 4/4 time signature) and the method further comprises: receiving second mixed input data different from the first mixed input data and based on a periodic beat structure, and performing at least one of a tempo and beat matching processing and a key matching processing. In particular, the tempo matching processing may comprise: receiving first input data obtained from the first mixed input data and second input data obtained from the second mixed input data, time stretching or resampling of at least one of the first input data and the second input data, and outputting first output data and second output data which have mutually matching tempos. Beat matching processing may comprise beat alignment between the first and second mixed input data, i.e. time position shifting of at least one of the first and second mixed input data, and outputting first output data and second output data which have mutually matching beat phases. Further, the key matching processing may comprise: receiving first input data obtained from the first mixed input data and second input data obtained from the second mixed input data, pitch shifting of at least one of the first input data and the second input audio data, and outputting first output data and second output data which have mutually matching keys.

In the above-described embodiment, first input data obtained from the first mixed input data may be the first mixed input data itself, or any decomposed track (e.g. first or second decomposed track) obtained from the first mixed input data, or the first recombined output data (i.e. obtained from first mixed input data through decomposition and recombination). Likewise, second input data obtained from the second mixed input data may be the second mixed input data itself, or any decomposed track (e.g. third or fourth decomposed track) obtained from the second mixed input data, or the second recombined output data (i.e. obtained from the second mixed input data through decomposition and recombination).

It should be noted that the first input data may be the first mixed input data, especially if the tempo and/or key matching processing is carried out in an early stage of the processing, i.e. before the step of decomposing. Alternatively, the first input data may be the first decomposed track, if tempo and/or key matching and/or beat matching processing is carried out after the step of decomposing. As another example, the first input data may be a modification of the first decomposed track, e.g. a modification obtained by applying an audio effect (such as delay, reverb, equalizer etc.) to the first decomposed track. The same applies to the second input data, which may be the second mixed input data or the second decomposed track or a modification thereof.

In the above embodiment, "mutually matching tempos" means that the tempos, measured in beats per minute, of the first and second output data are either equal or multiples of one another such that the beats of the first and second output data can be synchronized to each other. Furthermore, "mutually matching keys" means that the harmonic keys of the first and second output data are either equal or in a relationship of a minor key and its parallel major key (the key of one of the first and second output data is a minor key having a first fundamental tone and the key of the other one of the first and second output data is a major key having a second fundamental tone that is three semitones higher than the first fundamental tone).

Tempo and/or key matching processing as described in the embodiment above will significantly improve the application of the methods of the invention for live performances by a DJ, as it allows smooth blending of two songs, including crossfades between instrumental tracks and vocal tracks of two songs or swapping instrumental tracks or vocal tracks of two songs, i.e. recombining/remixing of decomposed tracks of two songs, because it allows both songs or parts thereof (decomposed tracks of both songs) to be audible at the same time (at same or corresponding tempo, beat phase and key) without disturbing the flow the music.

According to a second aspect of the present invention, the above object is achieved by a device for processing and playing an audio signal, preferably DJ equipment, comprising an audio input unit for receiving mixed input data, said mixed input data being a sum signal obtained from mixing at least a first source track with at least a second source track, a decomposing unit connected to the audio input unit for decomposing the mixed input data to obtain at least a first decomposed track resembling the first source track, and a playing unit for playing output data based on the first decomposed track.

With such a device, the advantage as described above for the method of the first aspect of the invention can be achieved by a suitable device containing all hardware and software components, audio input and output means as well as processing units which are necessary to receive and decompose the mixed input data, and to play the output data. In particular, devices of the second aspect of the invention may be embodied as DJ equipment comprising an electronic control unit (ECU) such as a computer, preferably a portable computer, and suitable hardware interfaces and speakers (e.g. built-in speakers or connectivity to connect the ECU to a PA system). The playing unit may have a digital-to-analog-converter to convert digital audio data into an analog audio signal. The input unit may have a decoding unit for decoding audio data encoded in different audio formats, such as MP3 or AAC.

In order to be configured for live applications, such as DJ applications as described above with respect to methods of the first aspect of the invention, the device may comprise a recombination unit for recombining at least the first decomposed track with a second track to generate the output data for the playing unit. Furthermore, the device may comprise a recompose controlling section adapted to be controlled by a user to generate a control input representing a desired setting of a first volume level of the first decomposed track and a second volume level of the second track, wherein the recombination unit is configured to recombine at least the first decomposed track at the first volume level with the second track at the second volume level to generate the output data. The recompose controlling section may be implemented by user interface controls displayed on a computer screen or alternatively a separate hardware which may include a housing, a control element such as a rotatable knob or a movable slider, a display, input and output ports etc.

The recompose controlling section may include a switch as a control element which allows input of only a limited number of discrete values, in particular a switch having only two switch positions (ON/OFF, 0/1, activated/deactivated), in order to set the first and second volume levels of the first and second decomposed tracks to a high level or ON value, for example 100%, or to a low level or OFF value, for example 0%, respectively. For example, there could be a vocal switch in order to switch the volume level of a decomposed vocal track between ON and OFF and/or there could be an instrumental switch to switch the volume level of a decomposed instrumental track between ON and OFF. The switch may be embodied as a push button, for example provided on a touch screen display. In order to avoid artefacts due to rapid volume changes, the device may include an auto-fading unit which automatically changes the volume level continuously and at a limited rate to the desired value according to the switching position of the switch, said auto-fading being started as soon as the user operates the switch.

In an embodiment of the device of the second aspect of the invention, there is provided a device, wherein the audio input unit is a first audio input unit for receiving first mixed input data being a sum signal obtained from mixing at least a first source track, for example a first vocal track, with at least a second source track, for example a first instrumental track, wherein the decomposing unit is a first decomposing unit for decomposing the first mixed input data to obtain at least the first decomposed track resembling the first source track, and the second decomposed track resembling the second source track, and wherein the device further comprises: a second audio input unit for receiving second mixed input data different from the first mixed input data, said second mixed input data being a sum signal obtained from mixing at least a third source track, for example second vocal track different from the first vocal track, with a fourth source track, for example a second instrumental track different from the first instrumental track, a second decomposing unit connected to the second audio input unit for decomposing the second mixed input data to obtain a third decomposed track resembling the third source track, and a fourth decomposed track resembling the fourth source track, wherein the recompose controlling section is adapted to be controlled by a user to generate a control input representing a desired setting of the first volume level of the first decomposed track, the second volume level of the second decomposed track, a third volume level of the third decomposed track, and a fourth volume level of the fourth decomposed track, and wherein the recombination unit is adapted to generate the recombined output data by recombining the first decomposed track at the first volume level, the second decomposed track at the second volume level, the third decomposed track at the third volume level and the fourth decomposed track at the fourth volume level.

A device of this embodiment is prepared to be used in creative work to recombine, to smoothly blend over or transition between two different songs or to create mashups of the songs to achieve a variety of new effects. In particular, such device may be embodied as DJ equipment for live performance.

In the devices of the second aspect of the present invention it is preferred that the recompose controlling section comprises at least one single recompose control element which is operable by a user in a single control operation for controlling the first volume level and the second volume level, in particular for increasing one of the first volume level and the second volume level, while at the same time decreasing the other one of the first volume level and the second volume level.

In all aspects and embodiments of the present invention, a single recompose control element for controlling a first volume level of a first track and a second volume level of a second track preferably refers to a control element operable by a user in a single control operation, such as single control movement (for example sliding movement, rotational movement etc.) or a single control switch operation (for example touching a button etc.), in order to change a ratio between the first and second volume levels from a first ratio in which the first volume level is higher than the second volume level, to a second ratio, in which the first volume level is less or equal than the second volume level. At least in parts of a control range of the single recompose control element, volume changes controlled by the single recompose control element may be performed simultaneously, for example by increasing the second volume level, while decreasing the first volume level.

In a preferred embodiment, the single recompose control element may have a control range extending from a first end point at which the first volume has a maximum value (for example about 100 percent) and the second volume has a minimum value (for example about 0 percent) to a second endpoint at which the first volume has a minimum value (for example about 0 percent) and the second volume has a maximum value (for example about 100 percent). More preferably, in a middle region of the control range, the first and the second volume levels both have a maximum value (for example about 100 percent). Between the middle region and each endpoint, the first and second volume levels may remain substantially constant or may increase or decrease in a linear or non-linear manner, respectively.

This allows the user to fade or switch between the first decomposed track and the second decomposed track in a single control operation, for example a touch of a button or switch, by a single continuous rotation of a rotatable control knob or a single continuous sliding movement of a single fader, in order to run smooth linear transitions from the first mixed input data to the second mixed input data (for example from a first song to a second song) or vice versa. In particular, two volume levels of different decomposed tracks can be manipulated by the user with only one hand or even only one finger which improves live performance capabilities of the system. This means that, for example, one hand could be used for operating a decompose/recombine control, whereas the other hand could be used for a crossfader or for the decompose/recombine control of the other song.

In a modification of the above-described embodiment, the device may further include a swap control element which, when operated by a user, controls the recombination unit such as to decrease one of the first and second volume levels and at the same time increase one of the third and fourth volume levels and/or which, when operated by a user, controls the recombination unit such as to increase one of the first and second volume levels and at the same time decrease one of the third and fourth volume levels. Note that "decrease" may include muting the volume level or setting the volume level to 0 percent, and "increase" may include setting the volume level to full scale or 100 percent.

For example, if the first decomposed track obtained from the first mixed input data is a vocal track of a first song and the third decomposed track obtained from the second mixed input data is a vocal track of a second song, the swap control element described above can be activated by a user such as to control the recombination unit to switch the volume of a vocal track currently contained in the recombined output data from ON to OFF and to switch the volume of another vocal track currently not contained in the recombined output data from OFF to ON, in other words switch the ON-OFF settings of both vocal tracks inversely. As another example, if the second decomposed track obtained from the first mixed input data is an instrumental track of a first song and the fourth decomposed track obtained from the second mixed input data is an instrumental track of a second song, the swap control element described above can be activated by a user such as to control the recombination unit to switch the volume of an instrumental track currently contained in the recombined output data from ON to OFF and to switch the volume of another instrumental track currently not contained in the recombined output data from OFF to ON, in other words switch the ON-OFF settings of both instrumental tracks inversely. Operation of such swap control element is preferably applied in situations where the decomposed track from the first mixed input data has an ON-OFF-setting different from that of the decomposed track from the second mixed input data.

In another embodiment of the present invention of the second aspect, there is provided a device of the above-described type, wherein the recompose controlling section comprises a first single recompose control element which is operable by a user in a single control operation for controlling the first volume level and the second volume level, in particular increasing one of the first volume level and the second volume level, while at the same time decreasing the other one of the first volume level and the second volume level, and a single recombination control element, which is operable by a user in a single control operation for controlling a first sum signal and a second sum signal, in particular increasing one of a first sum signal and a second sum signal, while at the same time decreasing the other one of the first sum signal and the second sum signal, the first sum signal being a sum of the first decomposed track at the first volume level and the second decomposed track at the second volume level and the second sum signal being a sum of the third decomposed track at the third volume level and the fourth decomposed track at the fourth volume level, and preferably a second single recompose control element which is operable by a user in a single control operation for controlling the third volume level and the fourth volume level, in particular increasing one of the third volume level and the fourth volume level, while at the same time decreasing the other one of the third volume level and the fourth volume level. An advantage of a device of this embodiment is that complexity of control is greatly reduced for fast and intuitive operation, in particular by a DJ during a live show. Even if the device receives two different mixed input data which are both decomposed into at least two decomposed tracks, which already results in four individual tracks (preferably four individual stereo tracks each having right and left channels, resulting in a total of at least eight channels), by means of the first and second single recompose control elements and the single recombination control element, switching, swapping and fading between the tracks can be performed very quickly and intuitively by single movements or single consecutive operations of the control elements.

In another embodiment of the present invention of the second aspect, there is provided a device which further comprises an input audio file buffer for loading therein segments of an input audio file having a predetermined file size and a predetermined playback duration, which contains audio data to play the mixed input data, a first segment buffer connected to the decomposing unit to receive and store a segment of the first decomposed track obtained from a segment of the input audio file, optionally a second segment buffer connected to the decomposing unit to receive and store a segment of the second decomposed track obtained from the same segment of the input audio file, wherein the playing unit comprises an audio interface having an analog-to-digital converter to generate an analog audio signal from the output data, said audio interface having an audio buffer for buffering portions of the output data for playback, wherein the size of the first segment buffer and/or the second segment buffer is larger than the size of the audio buffer of the audio interface, but smaller than the entire audio data of the (decoded) input audio file. According to this embodiment, separate buffers are provided to store the segments (not all segments at the same time, but only one or a few of the segments) of the decomposed tracks ready for recombination and/or playback which increases the processing speed and reduces memory footprint as compared to a situation where the entire input audio file is decomposed before playback and completely stored in a separate buffer. In other words the size of each segment buffer is smaller than the size of the entire (decoded) input audio file data. On the other hand, the first and second segment buffers are each larger in size than the audio buffer of the audio interface which ensures that the audio buffer of the audio interface can always be refilled by the content of the segment buffers in a timely manner, such that a continuous output signal can be produced and played without any audio dropouts or recognizable time lags. This embodiment therefore also assists live capabilities of the device.

Preferably, the audio buffer of the audio interface has a fixed standard size to store $2^n$ frames/samples of audio data (n being a natural number, preferably between 6 and 12), for example 512 audio frames, which corresponds to a playback duration of approximately 11 milliseconds at a sampling rate of 44.1 kHz. In contrast the size of the segment buffers is preferably larger such as to store segments with a playback duration of more than 1 second.

In a further embodiment of the invention of the second aspect, the device may further comprise a display device for displaying a first waveform representative of the first decomposed track and a second waveform representative of the second decomposed track, wherein the first waveform and the second waveform are displayed in an overlaid manner using one single baseline, and whereas the first and second waveforms are displayed using different signal axes and/or different drawing styles such as to be visually distinguishable from one another. This allows a user to visually monitor the result of decomposition, preferably in real-time, and to adapt the control for a recombination of the decomposed tracks. In particular, it allows a user to see some future audio data to be played within the next seconds and to adapt control in time, for example to quickly fade out the vocal track of a first song before the onset of such vocals during a transition from the first song to a second song. By using only one single baseline (line of signal value null, i.e. a line running along the time axis) for both decomposed waveforms and choosing different drawing styles or signal axes, the user will faster recognize the content of the audio data as components of the same mixed input data, such that the user can gather the information necessary for controlling the recombination unit more quickly or can visually cue to specific parts of the song more precisely, e.g. a vocal onset at the beginning of a chorus.

According to a third aspect of the present invention, there is provided a method for representing audio data, said audio data comprising at least a first track and a second track which are components of a joint audio mix, said method comprising displaying a first waveform representative of the first track and a second waveform representative of the second track, wherein the first waveform and the second waveform are displayed in an overlaid manner using one single baseline, and whereas the waveforms are displayed using different signal axes and/or different drawing styles such as to be visually distinguishable from one another. Such overlaid representation of waveforms according to the third aspect of the invention contains better semantic information about the audio content, in particular music, and thus is more akin to how humans perceive audio/music, as opposed to conventional waveform representation in a single waveform per song or per mixed input data and only approximate or combined or global frequency dependent coloring.

In the present disclosure, a display in an overlaid manner using one single baseline refers to a display of tracks which are drawn such that their baselines are displayed at identical positions on the coordinate system of the graphical display. Thus a display in an overlaid manner is in contrast to a display of tracks in a stacked manner, in which the time axes or baselines are drawn in parallel on top of each other.

In the context of the present disclosure, components of a (joint) audio mix are in particular decomposed tracks which are obtained from a mixed input signal through a decomposition processing (for example voice/instrumental separation etc.), such as that used in the methods of the first aspect of the invention. Furthermore components of a (joint) audio mix may be obtained separately, i.e. separate from the audio mix, for example as so-called stems created from single source tracks or subgroups of source tracks during production of the audio mix, i.e. before the source tracks are mixed down to obtain the audio mix. Such stems are available through some record labels, for example. In any case, within the present disclosure, components of a joint audio mix belong to the same audio mix. For example, if a mixed song contains vocal tracks and instrumental tracks, one of the vocal tracks and one of the instrumental tracks both are components of a joint audio mix, i.e. a joint song.

These advantages of the third aspect of the invention are particularly significant for DJ work, if one of the first and second tracks is a vocal track and the other one of the first and second tracks is an instrumental track. In particular, during blending or crossfading between two songs the DJ generally needs to keep special attention to the vocal parts of the songs and needs to avoid clashing of vocals of different songs, whereas the combination of instrumental parts of two songs is usually used as a creative effect to the benefit of the performance or is at least acceptable for the sake of blending/crossfading, provided that they have matching tempos, beats and keys.

Within the present disclosure (i.e. in all aspects and embodiments of the present invention, including the device of the fourth aspect of the invention), the use of different drawing styles may imply the use of different colors, line styles, hatchings or the like. Preferably the first waveform is displayed using a first drawing style which draws signal portions of the first waveform primarily or exclusively in a positive region relative to a baseline, and the second waveform is displayed using a second drawing style which draws signal portions of the second waveform primarily or exclusively in a negative region relative to the same baseline. For example, the first waveform may be displayed using a first drawing style which draws primarily or exclusively a positive signal portion of the first track, and the second waveform is displayed using a second drawing style which draws primarily or exclusively a negative signal portion of the second track. In an alternative embodiment, the first and second waveforms may be displayed using first and second drawing styles which both draw primarily or exclusively the positive signal portion or which both draw primarily or exclusively the negative signal portion, wherein the first waveform may be displayed using a first signal axis and the second waveform may be displayed using a second signal axis that runs opposite to the first signal axis. In both alternative embodiments the two waveforms therefore appear to be mirrored at the common baseline, with one waveform extending primarily or exclusively in one direction with respect to the baseline, and the other waveform extending primarily or exclusively in the other direction with respect to the baseline. This allows the user to clearly distinguish the waveforms while still having both waveforms on the same baseline for fast perception. The embodiments both make use of finding that sufficient information about the audio data can be obtained by a user from viewing only a part of the waveform, in particular only a positive or only a negative half portion of the waveform. As a further alternative, only one of the two waveforms may be drawn as a half waveform (only positive signal portions or only negative signal portions, or using absolute values of the signal portions drawn in positive or negative direction), while the other one of the two waveforms is drawn with both positive and negative signal portions.

In addition to displaying the waveforms with different signal axes and/or different drawing styles, in all aspects and embodiments of the present invention, including the device of the fourth aspect of the invention, the first waveform and/or the second waveform may further be displayed by rendering the waveform in a predetermined time interval with a color that depends on a frequency information of the respective track within the predetermined time interval, said frequency information preferably being indicative of a dominant frequency of the audio data within the predetermined time interval, which is preferably obtained from a frequency analysis of an audio signal derived from the audio data of the respective track within the predetermined time interval. In this manner, the user may further be able to recognize dominant frequencies occurring at certain positions of the tracks, which may indicate the presence of certain instruments such as bass, kick drums, cymbals, guitars, etc., and thus the visualization and speed of perception of the audio content can further be improved, which allows quicker and more intuitive operation of a device implementing such method. An example for frequency dependent coloring of waveforms is disclosed in U.S. Pat. No. 6,184,898 B1. If frequency dependent coloring according to the above-described embodiment is applied to decomposed tracks, in particular to a decomposed instrumental track, vocal components are excluded from the frequency analysis, which allows to obtain a much better (colored) visual representation of the audio signal as it is perceived by the ears. On the other hand, if the frequency analysis is carried out for the vocal frequency spectrum separately by analyzing a decomposed vocal track, results of frequency analysis and thus correct coloring will be improved for the vocal track as well.

In particular, it is preferred to use a method of the third aspect of the invention in connection with a method of the first aspect of the invention or within a device of the second aspect of the invention, for example in order to display decomposed tracks in an overlaid manner, such as a decomposed vocal track and a decomposed instrumental track.

In addition, according to a fourth aspect of the invention, there may be provided a device for representing audio data, for example a display device of a computer, said audio data comprising at least a first track and a second track, which are adapted to be played in a mix, said device comprising a first waveform generator generating a first waveform representative of the first track, a second waveform generator generating a second waveform representative of the second track, and an overlay-waveform generator generating an overlay-waveform showing the first waveform and the second waveform in an overlaid manner using one single baseline, wherein the waveforms are overlaid by the overlay-waveform generator using different signal axes and/or different drawing styles such as to be visually distinguishable from one another.

In a further embodiment of the third aspect of the present invention, the method may further include the steps of receiving mixed input data, said mixed input data being a sum signal obtained from mixing at least one first source track with at least one second source track; decomposing the mixed input data to obtain at least a first decomposed track resembling the at least one first source track, and a second decomposed track resembling the at least one second source track; reading a control input from a user, said control input representing a desired setting of a first volume level of the first decomposed track and a second volume level of the second decomposed track; displaying a first waveform representative of the first decomposed track and displaying a second waveform representative of the second decomposed track, wherein the first waveform and the second waveform are displayed in an overlaid manner using one single baseline, and wherein the waveforms are displayed using different signal axes and/or different drawing styles such as to be visually distinguishable from one another, wherein the first waveform is displayed with its signal axis being scaled or its appearance (for example color or opacity) being modified depending on the first volume level, and wherein the second waveform is displayed with its signal axis being scaled or its appearance (for example color or opacity) being modified depending on the second volume level. Such embodiment allows the volume settings or recompose settings received from the user via the control input to be directly visualized in the overlaid waveform representation. The user can therefore see volume adjustments directly on the display, while also seeing amplitude values of the decomposed tracks.

Preferably, in the above-described embodiment, the first and second waveforms are displayed with their signal axes being scaled or their appearance (for example color or opacity) being modified on the basis of current values of the first and second volume levels within a time period of not more than 2 seconds, preferably not more than 100 milliseconds, more preferably not more than 35 milliseconds. If the time period is smaller than 2 seconds, the method is usable for live performances, because it allows a user, for example a DJ, to verify or monitor the recombination of the tracks visually. If the time period is smaller than 100 milliseconds, the control setting such as volume levels can be visualized virtually in real time, which gives the user a feeling of direct feedback when changing the settings. Moreover, if the time period is smaller than 35 milliseconds, which is smaller than the time period of a frame of a usual display (for example with a frame rate of 30 frames per seconds), the user will not even realize at all that there is any time delay between manipulation of the control element and visualization of the volume levels within the overlaid waveforms.

According to a fourth aspect of the invention there is provided a device for processing and playing audio data, preferably DJ equipment, comprising a processing unit for processing audio data of at least a first track and a second track, a controlling section adapted to be controlled by a user to generate a control input representing a desired setting of a first volume level of the first track and a second volume level of the second track, a recombination/mixing unit configured to recombine the first track at a first volume level with the second track at a second volume level to generate output data, a visualization unit configured to generate waveform data for visualizing at least one waveform based on the first track, the second track and the control input, a playing unit for playing the output data, and optionally a display unit for displaying the waveform data. A device of the fourth aspect of the invention provides visual feedback to a user about audio data currently played, including audio data played or to be played within a certain time interval before and after the current playing position, wherein the visualization includes direct and instantaneous information about the first and/or second volume level as currently set by the user through the controlling section. For example, a DJ is then able to directly see his/her current inputs at the controlling section and will have visual information about his/her work in addition to audible information output by the playing unit.

Preferably, the visualization unit is configured to generate a first waveform based on the first track, wherein a scaling of a signal axis of the first waveform or a drawing style of the first waveform is set depending on the first volume level, and/or to generate a second waveform based on the second track, wherein a scaling of a signal axis of the second waveform or a drawing style of the second waveform is set depending on the second volume level. The waveforms may be visualized and displayed as separate waveforms, for example on parallel baseline a, or they may be drawn in an overlaid manner using one single baseline, preferably with different signal axes and/or different drawing styles such as to be visually distinguishable from one another, as will be described later.

In another embodiment of the device of the fourth aspect, the visualization unit may be configured to calculate a combination track representing a combination of at least the first track at the first volume level and the second track at the second volume level, and to generate the waveform data such as to visualize the waveform of the combination track. This results in the display of a waveform representing the output data obtained from the recombination/mixing unit, i.e. including the influences to the waveform as affected through the control input by the user.

Preferably, at least one of the first track and the second track is a decomposed track obtained from decomposing a mixed audio signal, in particular within the device, or is a component of an audio mix provided externally and input into the device. More particularly, the device of the third aspect can be adapted to carry out the method of the first and/or third aspect of the invention, and/or can be a device according to the second aspect of the invention, wherein the first track is preferably the first decomposed track and/or the second track is preferably the second decomposed track, and the controlling section is preferably the recompose controlling section.

The present invention will now be further described based on specific examples shown in the drawings.

FIG. 1 shows a schematic view of the components of the device for processing and playing an audio signal according to a first embodiment of the present invention.

FIG. 2 shows a functional diagram of the elements and signal flows in the device according to the first embodiment.

Figure 3:
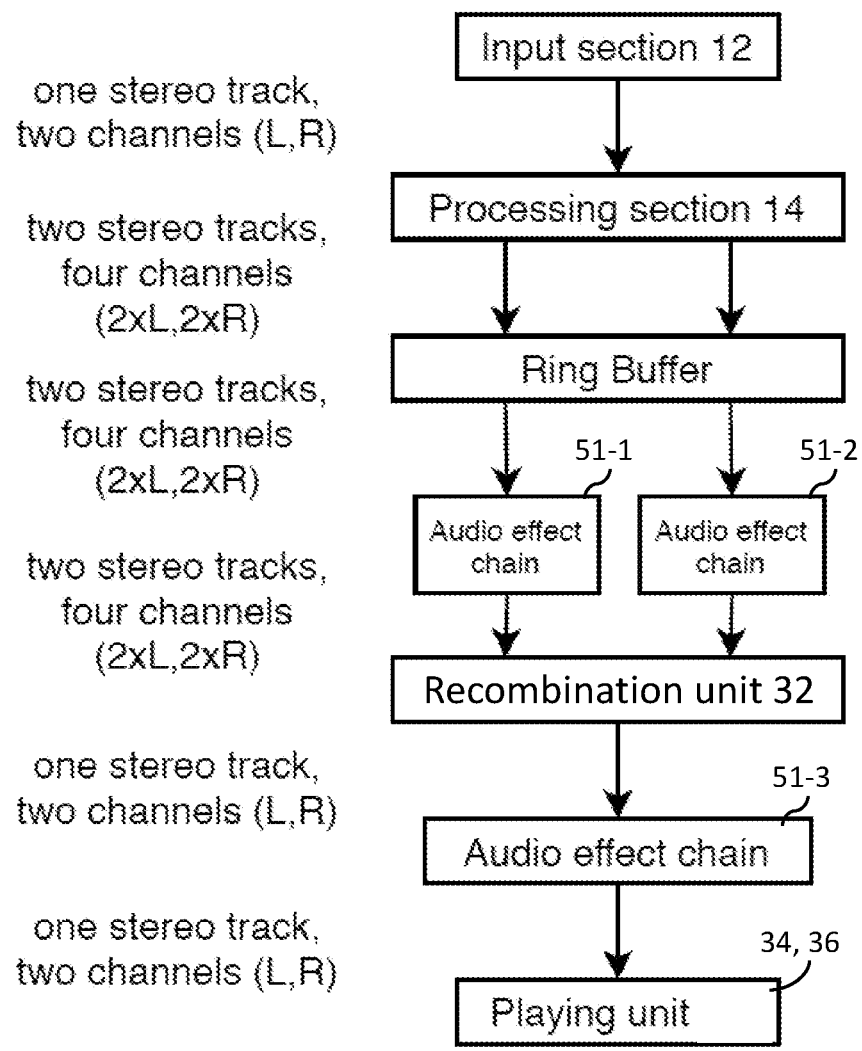
FIG. 3 shows a further functional diagram illustrating a signal flow in the device of the first embodiment.

With reference to FIG. 1, the first embodiment of the present invention is a device 10, preferably a DJ device. Device 10 comprises an input section 12 capable of loading a first input audio file A such as a first song A, and a second input audio file B such as a second song B. Both input audio files A, B may contain audio data in a common audio file format such as MP3, WAV or AIFF, and they have a fixed file size and playback duration (in particular song length in seconds) as conventionally known to be input into DJ equipment or other playback devices. Audio files A and B may be provided, downloaded or streamed from a remote server via Internet or other network connection, or may be provided by a local computer or a storage device integrated in the device 10 itself. Input section 12 may include suitable user interface means allowing a user to select one of a plurality of available audio files as input audio file A and another one of the plurality of audio files as input audio file B.

Device 10 further comprises a processing section 14, preferably including a RAM storage 16, a ROM storage 18, a persistent storage 19 (such as a hard drive or flash drive), a microprocessor 20, and at least one artificial intelligence system 22, for example first to fourth AI systems 22-1, ... , 22-4 which are connected to the microprocessor 20. The processing section 14 is connected to the input section 12 to receive audio data of audio files A and B.

Device 10 further comprises a recompose controlling section 24 including at least one recompose control element 26, for example a first control element 26-1, a second recompose control element 26-2 and a mix control element 28. Recompose controlling section 24 may further comprise a first play control element 30-1 and a second play control element 30-2 for starting or stopping playback of audio signals originating from the first or second mixed input data, respectively.

In addition, device 10 may include a recombination unit 32 connected to the recompose controlling section 24 for recombining audio data based on the settings of the control elements. Recombination may be carried out by multiplying different channels of audio data with scalar values based on the settings of the control elements and then adding the channels together sample by sample. Furthermore, an audio interface 34 (for example a sound card) having a digital-to-analog-converter is preferably connected to the recombination unit 32 to receive recombined output data and to convert the digitally recombined output data into an analog audio signal. The analog audio signal may be provided at an audio output 36 which may feature conventional audio connectors to connect audio cables such as line connectors or XLR connectors or wireless output (e.g. Bluetooth), which allow the audio output 36 to be connected to a PA system or speakers or headphones etc. (not illustrated). The PA system may include an amplifier connected to speakers to output the audio signal. As an alternative, internal speakers of the device such as tablet speakers or computer speakers or headphones might be used to output the analog audio signal.

Some or all components and features described above with respect to the first embodiment may be provided by an electronic control unit (ECU), such as a computer, in particular a tablet computer 35 running a software application that is programmed to operate the ECU to allow input, decomposition, recombining and output of audio data as described above with respect to FIG. 1, and to receive control input from a user, for example via a touchscreen 37 that displays the control elements of the recompose controlling section 24.

Further details of the internal components and the signal flow within the device 10 are explained in the following with respect to FIG. 2. Within input section 12, first and second input audio files A and B are obtained as described above.

Input audio files A, B are then transmitted to processing section 14, which contains at least a first decomposition unit 38 and a second decomposition unit 40. First decomposition unit 38 includes a first segmentation unit 42 and at least one AI system, preferably a first AI system 44-1 and a second AI system 44-2. The second decomposition unit 40 may likewise include a second segmentation unit 46 and at least one AI system, preferably a third AI system 44-3 and a fourth AI system 44-4.

The first segmentation unit 42 of the first decomposition unit 38 receives the first input audio file A and is adapted to partition the audio file into a number of consecutive segments. Preferably, the complete input audio file A is partitioned into segments that correspond to time intervals in the audio signal that is playable from the audio file. Preferably, the starting segment is defined such that the starting point of the starting segment corresponds to the beginning of the audio file (playing position 0:00) on the time scale and the end point of the starting segment corresponds to the end of a first time interval at the beginning of the audio file. A second and each subsequent segments are then defined by consecutive time intervals of a same length, such that the starting points of the time intervals increase from one time interval to the next time interval.

More particular, consider an audio file as a digital representation of an analogue audio signal that is sampled with a predetermined sampling rate fs given by the number of samples per second. Sampling may be carried out during recording through an analog-to-digital-converter, such as an audio interface, for example. In case of digitally produced audio data (for example from digital synthesizers, drum computers etc.), the samples and in particular the audio data represented by each sample, are computer generated values. Each sample represents the signal value (e.g. a measured average value) within a sampling period T, wherein fs=1/T. For audio files, fs may be 44.1 kHz or 48 kHz, for example. One sample is also referred to as one frame. Now, in the present embodiment, a starting frame of the first segment may be the very first frame of the audio data in the audio file at a time position 0, the starting frame of the second segment may be the frame immediately following the end frame of the first segment, the starting frame of the third segment may be the frame immediately following the end frame of the second segment and so on. The segments may all have the same size with respect to their time scale of the playable audio signal or may have the same number of frames, except for the last segment, which may have an end point defined by the end point or the last frame of the (decoded) audio file or the end point of the playable audio signal on the time scale.

In fact, in methods and devices of the present invention, processing and in particular decomposition is preferably carried out on the basis of segments exactly defined by and/or corresponding to the frames of the input audio file, which ensures frame accurate positioning within the tracks, in particular within the decomposed tracks during recombining or playback, and direct translation of audio positions in the mixed input signal to audio positions in the decomposed track. A decomposed track obtained in this manner may therefore have exactly the same time scale as the mixed input track and can be further processed, for example by applying effects, resampling, time stretching, and seeking, e.g. for tempo and beat matching, without shift or loss in accuracy on the time scale. Preferably, a decomposed segment contains exactly the same amount of frames as the original input audio data corresponding to the segment.

Preferably, the size of the segments is chosen such that the length of the corresponding time intervals is smaller than 60 seconds and larger than one second. This ensures sufficient segmentation of the input audio file to achieve remarkable acceleration of the processing necessary to start playing from any given position. More preferably, the segments have a size corresponding to time intervals having a length which is between 5 seconds and 20 seconds. This ensures sufficient audio data for the AI systems 44 to achieve satisfying decomposition results on the one hand and reduce the audio data to be decomposed in one segment to a value small enough to achieve virtually immediate availability of the decomposed audio data to allow application of the device in a live performing situation.

In the output of the first segmentation unit 42 a segment of the input audio file A is provided to be transmitted to the at least one AI system 44. Preferably, the segment is doubled or copied to be transmitted to the first AI system 44-1 and, at the same time, i.e. in parallel, to the second AI system 44-2. One and the same segment of the input audio file A can therefore be processed at the same time in the first AI system 44-1 as well as in the second AI system 44-2.

Each of the AI systems used in the embodiments of the present invention may be trained artificial neural networks (trained ANN) as described above in this disclosure. In particular, a trained ANN as described by Prétet et al. could be used which is able to extract a first decomposed track representing a vocal track or a singing voice track from the mixed audio data. In particular, the AI systems 44 may calculate a Fourier transformation of the audio data (i.e. of the audio data contained in a segment of the input audio file) such as to obtain a spectrum of the frequencies contained in the audio data, wherein the spectrum is then introduced into the convolutional neural network which filters parts of the spectrum recognized as belonging to a certain source track or the sum of certain source tracks, for example belonging to the vocal part of the mix. The filtered spectrum is then retransformed into a waveform signal or audio signal which, when played back, contains only the filtered part of the original audio signal, for example the vocal part.

To be capable of this filtering analysis, an AI system such as an ANN may be used as described by Prétet et al. for example, which was trained by data sets containing large numbers of professionally recorded or produced songs from different genres, for example Hip Hop, Pop, Rock, Country, Electronic Dance Music etc., wherein said data sets do not only include the finished songs but also the respective vocal and instrumental tracks as separate recordings.

Stored within the first decomposition unit 38 of device 10 of the first embodiment (preferably within a RAM memory thereof, especially the internal RAM of the computer 35) may be two separate and fully trained instances of AI systems (different or equal AI systems) of the above-mentioned type such as to be operable simultaneously and independent from one another to generate a first decomposed track and a second decomposed track, respectively. Preferably, first and second decomposed tracks are complements, which means that the sum of the first decomposed track and the second decomposed track, when recombined with normal volume levels (i.e. each at 100 percent), resembles the original mixed input data. For example, the first decomposed track may resemble the complete vocal part of the mixed input data, whereas the second decomposed track may resemble the complete remainder of the mixed input data, in particular the sum of all instrumental tracks, such that recombining both decomposed tracks at appropriate volume levels results in an audio signal that, in terms of its acoustic perception, very closely resembles or cannot even be distinguished from the original mixed input data.

Preferably, the first and/or second decomposed track are each stereo tracks containing a left-channel signal portion and a right-channel signal portion, respectively. Alternatively they may each or both be mono tracks or multi-channel tracks with more than two channels (such as 5.1 surround tracks, for example).

The second decomposition unit 40 may be configured in a manner similar or corresponding to that of the first composition unit 38, thus including the second segmentation unit 46 which partitions the second input audio file B into a number of segments of fixed starting points and end points, transmitting the segments consecutively to both a third AI system and a fourth AI system for parallel processing and decomposition to obtain a third decomposed track and a fourth decomposed track (each of which may be mono tracks, stereo tracks, or multi-channel tracks with more than two channels (such as 5.1 surround tracks, for example)).

The decomposed tracks from the first and second decomposition units 38 and 40 are then transmitted to the recombination unit 32 which is configured to recombine at least two of the decomposed tracks at specified and controllable volume levels and to generate recombined output data. The volume levels of the decomposed tracks may be controlled by a user by virtue of at least one control element. For example, a first control element 26-1 may be provided which allows a user to control a ratio between a first volume level of the first decomposed track and a second volume level of the second decomposed track, whereas, alternatively or in addition, a second control element 26-2 may be provided which allows a user to control a ratio between a third volume level of the third decomposed track and a fourth volume level of the fourth decomposed track.

In the recombination unit 32 the first and second decomposed tracks are then recombined with one another in a first recombination stage 32-1 based on the volume levels set by the first control element 26-1 to obtain a recombination A' from the first input audio file A. Further, the third and fourth decomposed tracks may be recombined in a second recombination stage 32-2 of the recombination unit 32 according to the third and fourth volume levels set by the second control element 26-2 such as to obtain a second recombination B' from the second input audio file B. Furthermore, recombination A' and recombination B' may be introduced into a mixing stage 48 which mixes the first recombination A' and second recombination B' according to the setting of the mix control element 28 controllable by the user. The mix control element 28 may be adapted to control a ratio between the volume levels of the first and second recombinations A' and B'.

The recombined output data generated by the recombination unit 32 is then transmitted to a playing unit which may include audio interface 34 connected to audio output 36.

As can be seen in FIG. 2, the first and second decomposed tracks as output by the first decomposition unit 38 may be input into a first visualization unit 49-1. In addition, the third and fourth decomposed tracks as output by the second decomposition unit 40 may be input into a second visualization unit 49-2. Moreover, first and/or second visualization units 49-1 and 49-2 may be connected to the recombination unit 32 to obtain information about the current settings of the control elements 26-1, 26-2, for example. First and/or second visualization units 49-1 and 49-2 are preferably configured to display an overlay waveform of recombination A' and recombination B', respectively, as will be explained in more detail later on.

Processing of the audio data within device 10 of the first embodiment of the invention is further illustrated with respect to FIG. 3, which shows the processing of only the first input audio file A as an example, which can be applied to the processing of the second input audio file B, or any additional other input audio file, in the same manner. As can be seen in FIG. 3, after the decomposition process in the processing section 14, segments of the first and second decomposed tracks are stored in an audio buffer (for example a ring buffer) for immediate further processing and in particular for playback, preferably real time playback. The audio buffer has multiple data arrays in order to store audio data from the current segment of the first decomposed track as well as audio data from the current segment of the second decomposed track, each with the given number of channels (Mono, Stereo, Surround, etc.). For example, if both decomposed tracks represent stereo signals, a four-array buffer may be used in order to store left and right channel portions of the first and the second decomposed track segments, respectively.

Output of the buffer may be connected to the recombination unit 32 which generates a recombined track according to the setting of the first control element 26-1.

If the device 10 includes one or more audio effect chains to apply audio effects to the signals, such as delay effects, reverb effects, equalizer effects, key or tempo changing effects, for example achieved by pitch-shifting, resampling and/or time stretching effects, etc. as conventionally known as such for DJ equipment, such effect chains could be inserted at different positions in the signal flow. For example, the decomposed tracks (segments) output by the buffer may each be routed through audio effect chains 51-1 and 51-2, respectively, such as to apply effects individually to the respective decomposed track as desired. The output of the audio effect chains 51-1, 51-2 may then be connected to the recombination unit 32. In addition or as an alternative, an effect chain 51-3 could be arranged at a position with respect to the signal flow at which the first and second decomposed tracks are recombined in accordance with the first and second volume levels set by the first control element 26-1, in particular at a position after the recombination unit 32 or after the first recombination stage 32-1 of recombination unit 32. The advantage of this arrangement is that the number of channels to be submitted to the audio effect chain 51-3 is reduced within the recombination process to at least one half of the number of channels before the first recombination stage and is in particular equal to the number of channels of the first mixed input data (one channel for a mono signal, two channels for a stereo signal, more than two channels for other formats such as surround signals). Thus, the additional functionality of the decomposition units of the present embodiment will not bring about any increased complexity or performance overload of the audio effect chain 51-3 as compared to the conventional processing of the mixed input data. The same audio effect chains as for conventional DJ equipment may even be used.

With reference to FIGS. 4 to 10, second to eighth embodiments are explained below. Each embodiment is a modification of the first embodiment described above with respect to FIGS. 1 to 3 and all features and functions described above for the first embodiment are preferably included in the same corresponding manner in each of the second to eighth embodiments unless described differently in the following. These same or corresponding features or functions will not be described again.

Figure 4:
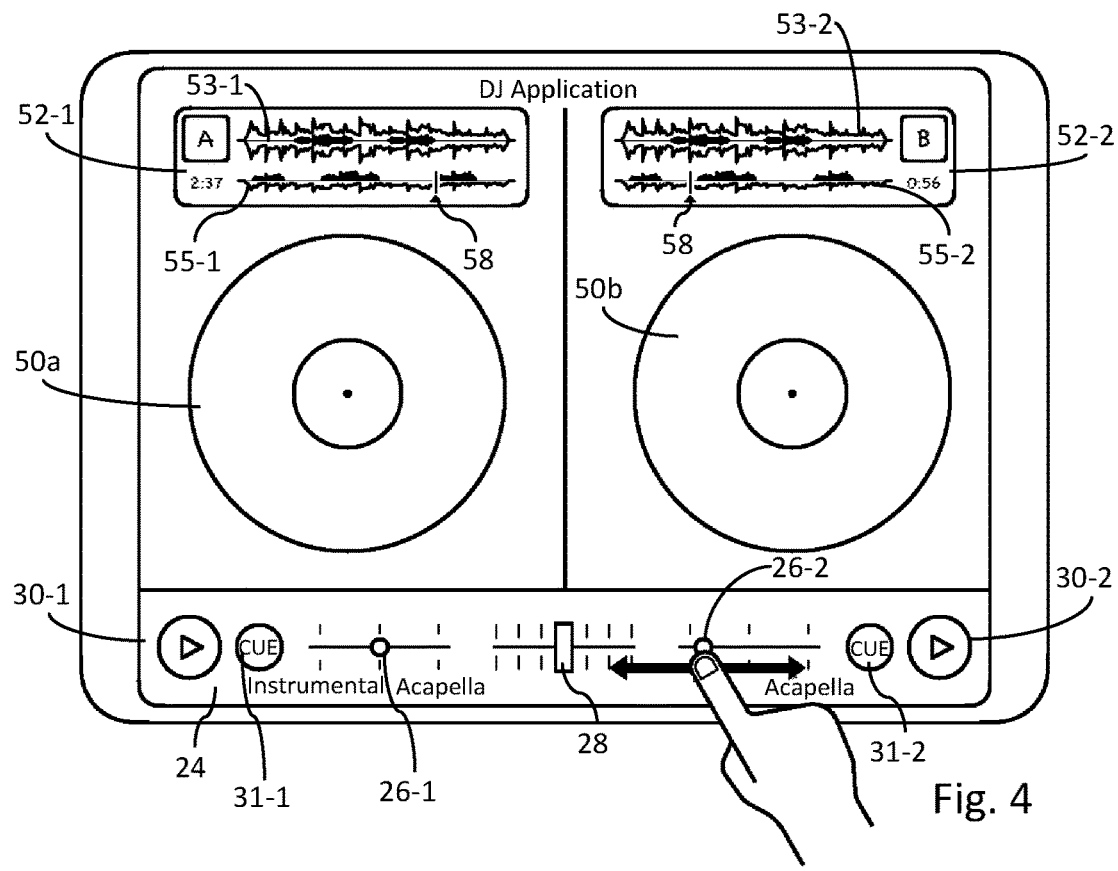
FIGS. 4 to 10 show second to eighth embodiments of the present invention which are each modifications of the first embodiment.

In the second embodiment illustrated in FIG. 4, a first DJ deck 50a and a second DJ deck 50b are displayed on a display, in particular a touch display which allows a user to operate them by means of gestures or movements corresponding to the operation of physical DJ decks. The second embodiment may in particular be advantageous to allow a user, in particular a DJ, to perform scratching effects during live performance or to skip to different time positions in a song.

As a further feature of the second embodiment, which may be provided independent from (in addition or alternatively to) the DJ decks 50a, 50b, the first control element 26-1, and preferably also the second control element 26-2, may be embodied as sliders, either as hardware sliders mechanically movable by a user, or by virtual sliders presented on a touch screen or on a computer screen movable by a touch gesture or by a pointer, a computer mouse or any other user input. The slider of the first control element 26-1 allows continuous variation of the ratio between the first volume level of the first decomposed track and the second volume level of the second decomposed track in a range from one end position at which the first volume level is set to 100% and the second volume level is set to 0% to another end position at which the first volume level is set to 0% and the second volume level is set to 100%. Between the end positions, when moving the slider in one direction, one of the first and second volume levels is increased, while the other one of the first and second volume levels is decreased at the same proportion.

As a preferred default setting, at a center position of control element 26-1, both first and second volume levels are set to full/normal volume=100%, i.e. the recombination corresponds to the original first mixed input data. The volume adjustment curve can be user configurable though if needed. By default the volume levels may be calculated as follows:

$$\text{first volume level} = \text{MIN}(1.0, \text{sliderValue} * 2.0),$$

$$\text{second volume level} = \text{MIN}(1.0, (1.0 - \text{sliderValue}) * 2.0),$$

wherein "MIN (value 1, value2)" represents a minimum value of value 1 and value 2, "sliderValue" represents a setting of control element 26-1 running from 0 (left end value) to 1.0 (right end value). Increasing and decreasing of the volume levels is reversed when moving the slider in the other direction. The user will thus be able to smoothly crossfade between the first decomposed track and the second decomposed track or adjust a desired recombination between both decomposed tracks by a single continuous movement with only one hand or even only one finger. Preferably, the second control element 26-2 is operable in the same manner as the first control element 26-1 to control the third and fourth volume levels of the third and fourth decomposed tracks, respectively.

Preferably, the mix control element 28 is also realized as a slider and may be positioned between the first and second control elements 26-1, 26-2 for intuitive operation of the device. As in the first embodiment, the mix control element 28 may be a crossfader and/or may be adapted to control a ratio between the volume levels of the first and second recombinations A' and B', wherein recombination A' is obtained from recombining the first decomposed track and the second decomposed track, and recombination B' is obtained from recombining the third decomposed track and the fourth decomposed track.

Device 10 may further be configured to display a first waveform section 52-1 in which waveforms representing the first and second decomposed tracks or a recombination thereof are displayed. First and second decomposed tracks may be visualized in an overlaid manner such as to share a common baseline/time axis, but using different signal axes and/or different drawing styles so as to be visually distinguishable from one another. In the example shown in FIG. 4, the first waveform section 52-1 displays a zoom-in version 53-1 of the first and second waveforms, in which first and second waveforms are displayed in an overlaid manner using a common baseline that is scaled to view a time interval containing the current play position and preferably having a size between 1 second and 60 seconds, more preferably between 3 seconds and 10 seconds. The zoom-in version 53-1 may scroll along with the playback such as to maintain a current playing position visible, in particular at a fixed position on the display. In addition or alternatively, the first waveform section 52-1 may display a zoom-out version 55-1 of the first and second waveforms, in which first and second waveforms are displayed in an overlaid manner using a common baseline that is scaled to view a time interval containing the current play position and preferably having a size corresponding to the length of an input audio file, for example the whole song A and/or a size between 60 seconds and 20 minutes. Preferably, the zoom-out version 55-1 does not move with respect to the time axis, but rather shows a playhead 58 representing the current playing position, which moves along the time axis.

Likewise, device 10 may be configured to display a second waveform section 52-2 in which waveforms representing the third and fourth decomposed tracks are displayed in the same manner as described above for the first waveform section 52-1 and the first and second decomposed tracks, in particular by means of a zoom-in version 53-2 and a zoom-out version 55-2.

First and/or second waveform sections 52-1, 52-2 may be configured to receive user input commands such as touch gestures or mouse/pointer input commands in order to change the current playing position and to jump to a desired position within the audio data, for example by simple clicking or touching the desired position on the baseline in the zoom-out version 55-1/55-2.

In the example of FIG. 4, the first and second decomposed tracks of the zoom-in version 53-1 of the first waveform section 52-1 are displayed using different signal axis and different drawings styles. In particular, the signal axis of the first decomposed track, for example the decomposed vocal track, is scaled significantly smaller than that of the second decomposed track, for example the decomposed instrumental track, such that the first decomposed track is visualized as lying within the second decomposed track and thus being visually distinguishable. Furthermore the waveform of the first decomposed track is displayed with a drawing style using a dark color, whereas the waveform of the second decomposed track is displayed with a drawing style using a lighter color.

Likewise the first and second decomposed tracks of the zoom-out version 55-1 of the first waveform section 52-1 are display using different drawings styles. In particular, only an upper half of the waveform of the first decomposed track and only a lower half of the waveform of the second decomposed track are displayed. Furthermore the waveform of the first decomposed track may be displayed with a drawing style using a dark color, whereas the waveform of the second decomposed track may be displayed with a drawing style using a lighter color. Of course, all these drawing styles could be interchanged or modified and/or applied to the waveforms of the second waveform section 52-2.

The overlaid representations of the decomposed tracks in the first and second waveform sections 52-1, 52-2 may be provided by a method according an embodiment of the invention, which will be described in more detail below with respect to FIGS. 12 and 13.

Furthermore, settings of the control elements 26-1, 26-2, 28 and 30-1, 30-2 may be reflected in the visualization of the decomposed tracks in the first and second waveform sections 52-1, 52-2 through respective signal amplitude changes of the individual waveforms displayed. In particular, the signal axes of the waveforms of the decomposed tracks as displayed in the first and second waveform sections 52-1, 52-2 are scaled depending on the current settings of the volume levels of the respective decomposed tracks as set by the user through the control elements 26-1, 26-2, 28 and 30-1, 30-2. This allows direct and preferably immediate visual feedback of the volume settings to the user.

Device 10 may have a first cue control element 31-1 and/or a second cue control element 31-2, associated to the first and second mixed input files (songs A and B), respectively, which can be operated by a user to store a current playing position and to retrieve and jump to it at any point in time later as desired.

Figure 5:
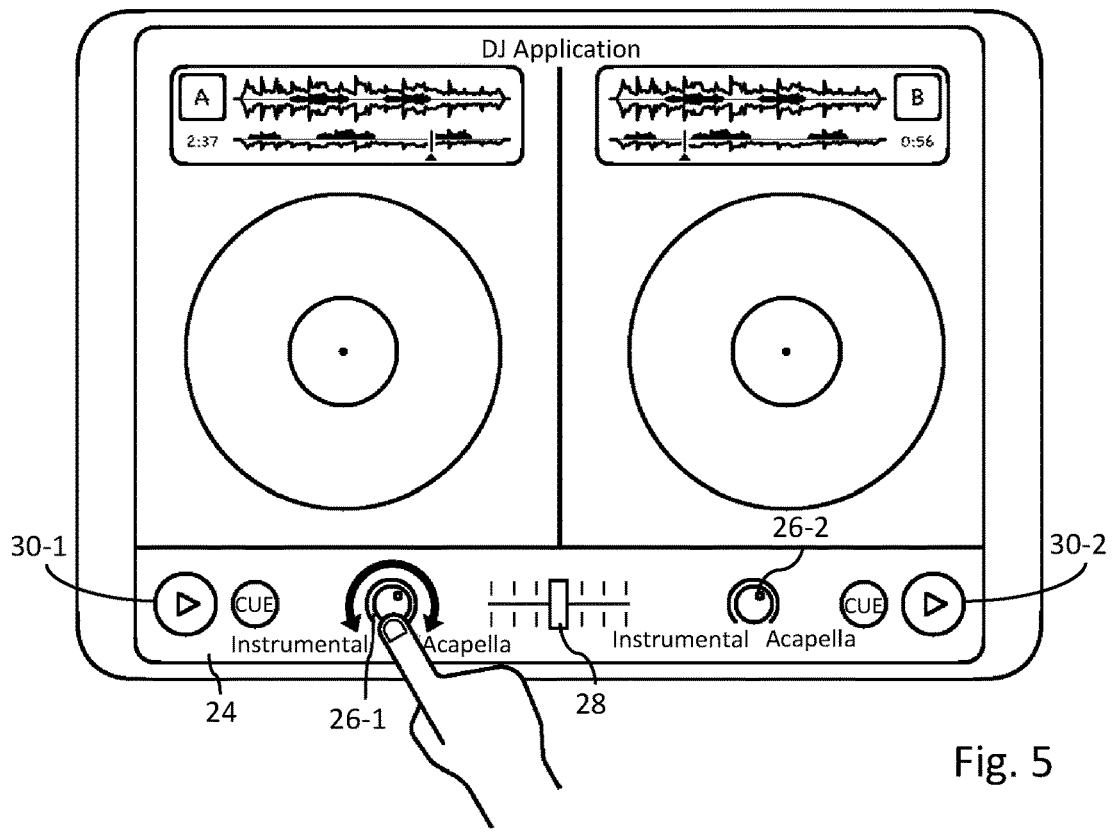

In the third embodiment illustrated in FIG. 5, first and second control elements 26-1, 26-2 are similar in function to the respective control elements in the second embodiment except that they are rotatable knobs instead of sliders. However, the knobs can also be rotated between two end positions in which one of the first and second volume levels is set to 100% whereas the other one of the first and second volume levels is set to 0%. Again, the user may crossfade between the first and second decomposed tracks by means of a single continuous movement using only one hand or only one finger. The same configuration may be implemented for the second control element 26-2.

Figure 6:
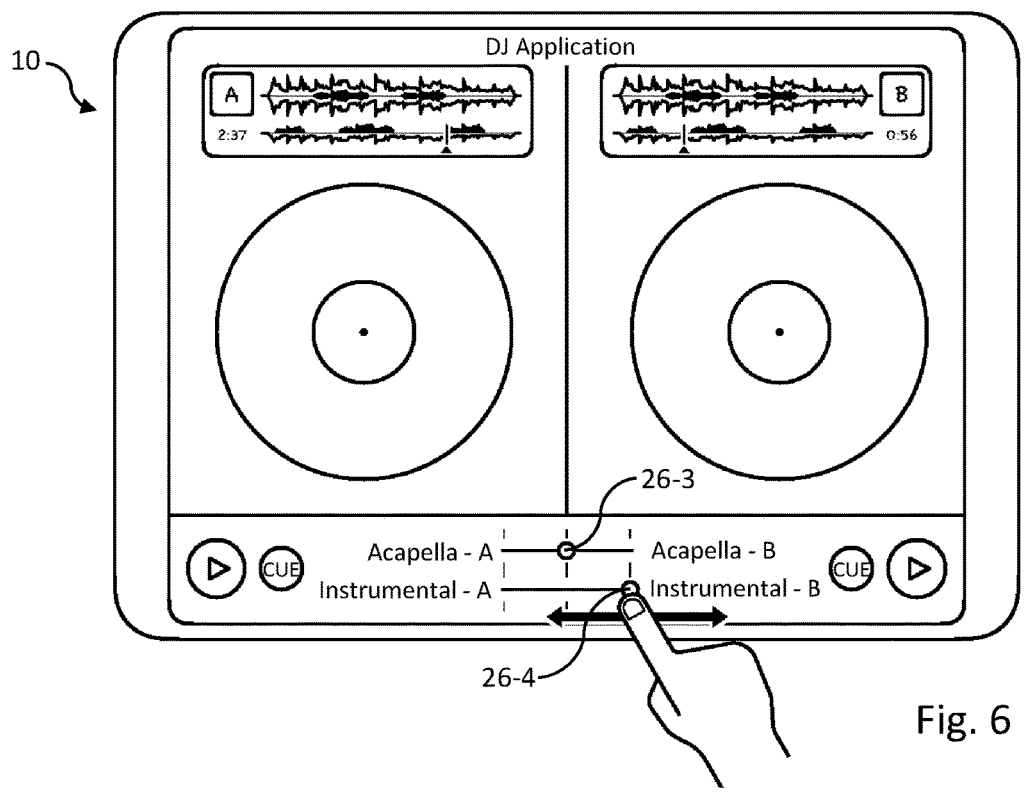

FIG. 6 illustrates a fourth embodiment of the present invention which uses a different controlling section to control the recombination unit. In particular, instead of or in addition to the first and second control elements 26-1, 26-2 as described for the first to third embodiments, in the fourth embodiment there is provided a third control element 26-3 which controls a ratio between the first volume level of the first decomposed track and the third volume level of the third decomposed track, in other words, volume levels of decomposed tracks of different decomposition units 38, 40. It furthermore may comprise a fourth control element 26-4 which allows a user to control a ratio between the second volume level of the second decomposed track and the fourth volume level of the fourth decomposed track. By means of these control elements 26-3, 26-4 it will be possible, for example to easily and directly control, by means of a single movement with one hand or one finger, a ratio between a vocal part of the first audio file and a vocal part of the second audio file by manipulating the third control element 26-3. Likewise, by manipulating the fourth control element 26-4 in a single movement by only one hand or only one finger, a user may control a ratio between the volume level of the instrumental part of the first audio file and the instrumental part of the second audio file. This allows a DJ for example to make an even more seamless transition by first cross fading the vocal track from song A to song B and subsequently cross fading the instrumental track from song A to song B, thus achieving a more continuous flow of the music.

The third control element 26-3 and/or fourth control element 26-4 may be implemented as sliders (hardware slider or software user interface, e.g. virtual touch screen sliders) or as rotatable knobs (likewise as hardware knobs or virtual knobs on a touch screen, computer screen or any other display device).

In the first to fourth embodiments described above, device 10 was preferably realized as an all-in one device including input section 12, processing section 14, recombination unit 32, playing unit (in particular audio interface 34 (e.g. sound card) and audio output 36), in one single housing or, alternatively, as a complete virtual equipment realized as a software running on an electronic control unit (ECU) with the control elements being visualized on a display of the ECU and the electronic components of the processing section 14 being provided by the integrated electronic components of the ECU. Such ECU may be a standard personal computer, a multi-purpose computing device, a laptop computer, a tablet computer, a smartphone or an integrated, standalone DJ controller.

Figure 7:
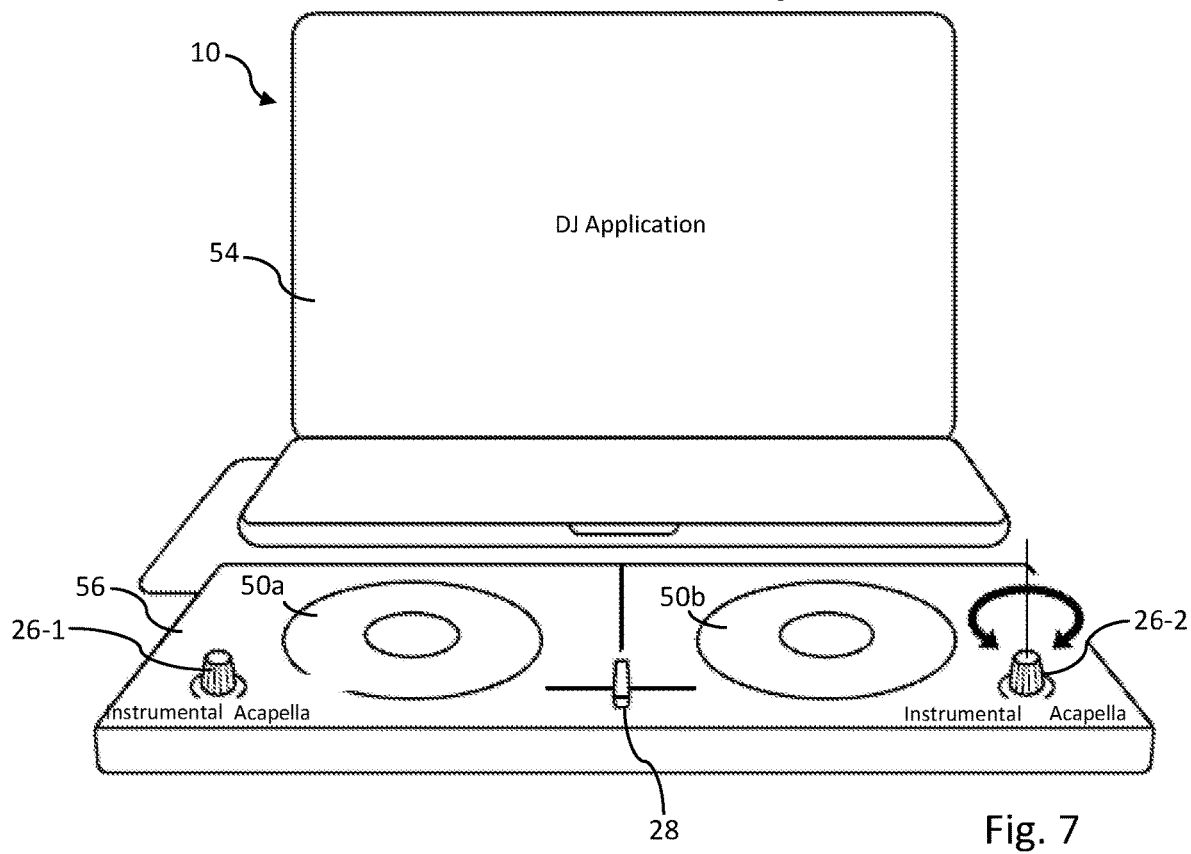

As a further alternative, according to a fifth embodiment shown in FIG. 7, device 10 may be implemented as a combination of a computer 54 (personal computer, laptop computer, tablet or smartphone or other multi-purpose computing device) and a periphery device 56 which is an external hardware component that can be connected to the computer by cable (such as USB connection, MIDI connection, HID connection, fire wire connection, LAN connection etc.) or by any wireless connection using the usual wireless protocols (WIFI, GSM, Bluetooth etc.). Preferably, the periphery device 56 includes the recompose controlling section 24 with the control elements such as control elements 26-1, 26-2 and 28. Furthermore, the periphery device 56 may include Jog wheels 50*a*, 50*b* or other features known from conventional DJ equipment. The conventional hardware of the computer 54 may be used as the processing section 14, in particular to store and run the AI systems and the segmentation units in the RAM memory of the computer 54. Furthermore, a processor/CPU may also be included in the peripheral device 56 to perform some or all of the tasks of the processing section 14.

Figure 8:
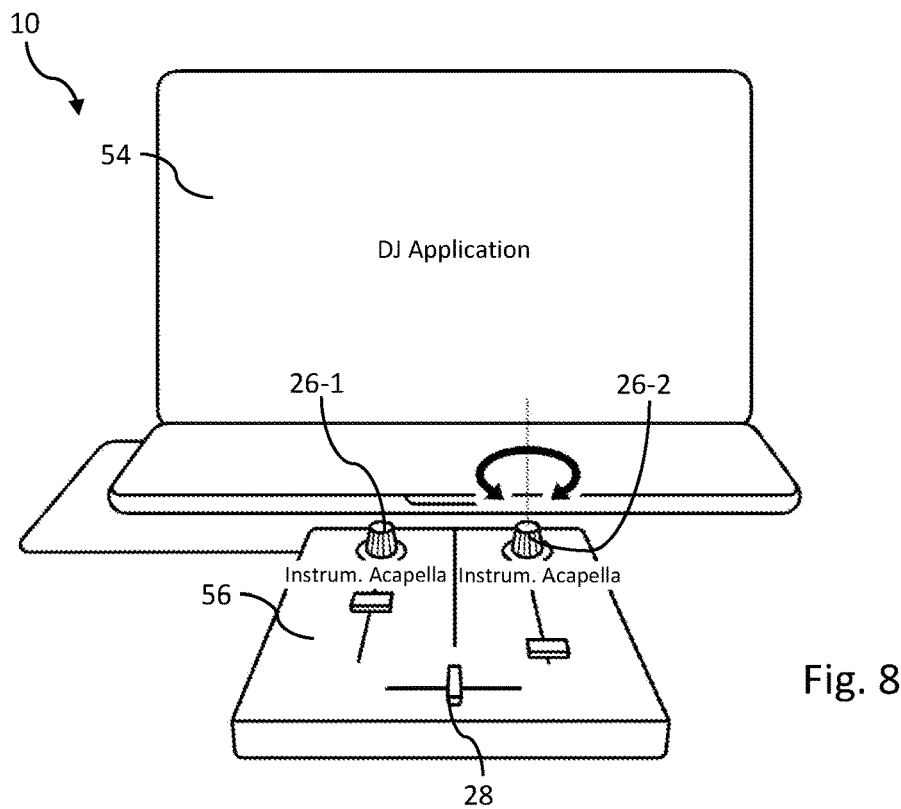

A sixth embodiment of the present invention as shown in FIG. 8 is a slight modification of the fifth embodiment, wherein the periphery device 56 of the sixth embodiment is relatively compact and just includes the recompose controlling section and the control elements in order to reduce the additional hardware required to carry out the present invention to a minimum and still provide for mechanical control elements.

Figure 9:
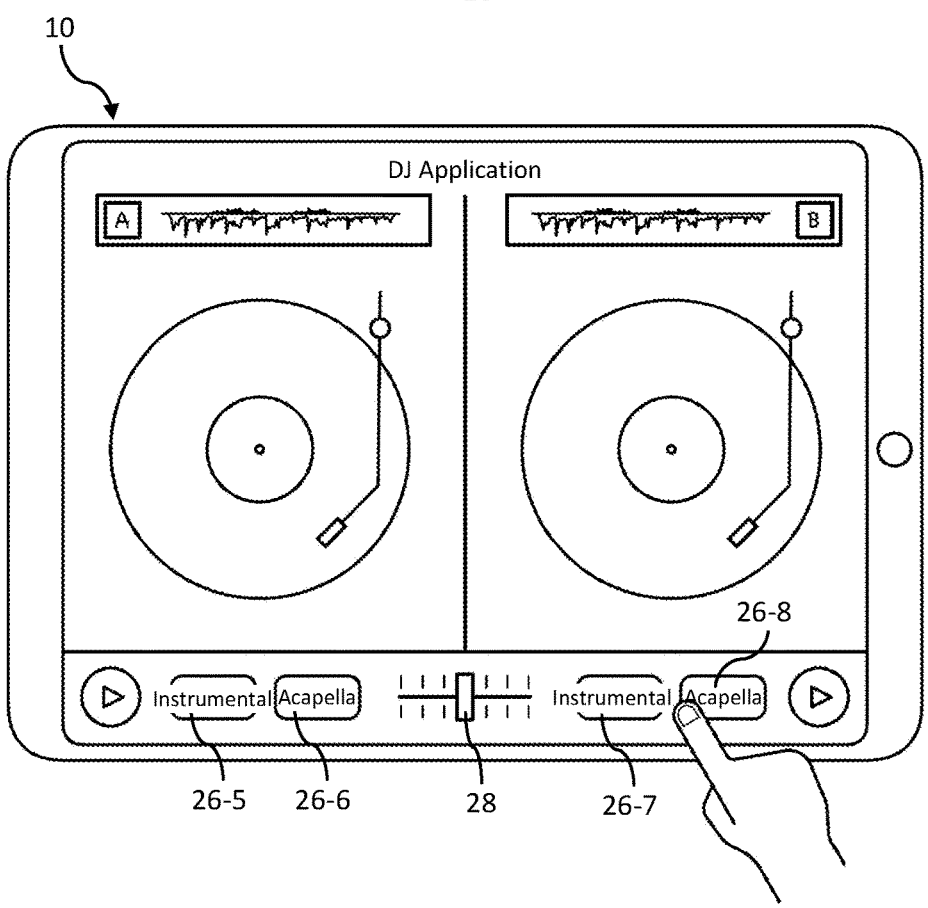

In a seventh embodiment shown in FIG. 9, the device 10 comprises a song-A instrumental button 26-5 controllable by the user to switch ON or OFF the decomposed instrumental track of song A, and/or a song-A vocal button 26-6 controllable by the user to switch ON or OFF the decomposed vocal track of song A, and/or a song-B instrumental button 26-7 controllable by the user to switch ON or OFF the decomposed instrumental track of song B, and/or a song-B vocal button 26-8 controllable by the user to switch ON or OFF the decomposed vocal track of song B. By realizing some or all of these buttons 26-5 to 26-8 as separate buttons, the user can individually and by only one single operation (one tap with the finger) switch ON or OFF a selected one of the decomposed tracks. Note that in the present description, switching ON and OFF a track refers to unmuting and muting the track, respectively.

Preferably, upon operation of one of the buttons 26-5 to 26-8 by the user, the respective decomposed track is not switched ON or OFF immediately, but the device is controlled to continuously or stepwise increase or decrease the volume of the respective track within a certain time period of preferably more than 5 milliseconds or even more than 50 milliseconds, such as to avoid acoustic artefacts arising from instant signal transitions.

Figure 10:
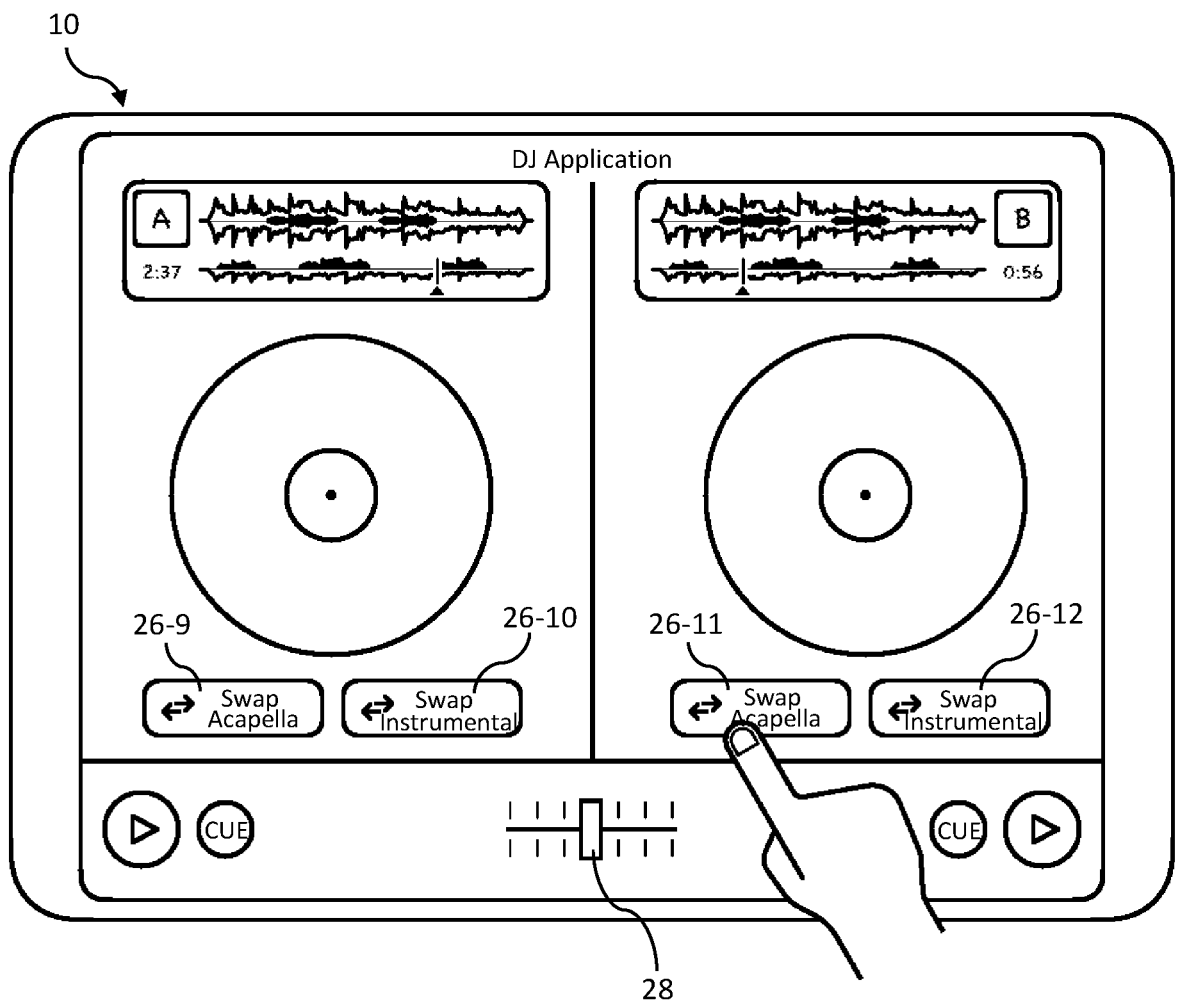

In an eighth embodiment shown in FIG. 10, the device 10 may comprise a first recombination stage configured to obtain a first recombination A' by recombining the decomposed vocal track of song A with the decomposed instrumental track of song A, and a second recombination stage configured to obtain a second recombination B' by recombining the decomposed vocal track of song B with the decomposed instrumental track of song B. Furthermore, device 10 may comprise a mix control element 28 configured such as to be operable by a user in a first direction to increase a volume level of the first recombination A' or in a second direction to increase a volume level of the second recombination B'. In addition, there is preferably provided a mixing stage which mixes the first and second recombinations A' and B' with one another according to their respective volume levels to obtain the recombined output track. Such signal flow is similar to that explained above with reference to FIG. 2.

Now, in the eighth embodiment, the device 10 may further include a vocal swap button 26-9 controllable by the user, in particular through one single operation such as simply pushing the button, to route the decomposed vocal track of song A to the second recombination stage and to route the decomposed vocal track of song B to the first recombination stage. In other words, operation of the vocal swap button 26-9 swaps the two decomposed vocal tracks of songs A and B before they enter the first and second recombination stages, respectively. Repeated operation of the vocal swap button 26-9 may again swap the two decomposed vocal tracks and so on.

In addition or alternatively, the device 10 may include an instrumental swap button 26-10 controllable by the user, in particular through one single operation such as simply pushing the button, to route the decomposed instrumental track of song A to the second recombination stage and to route the decomposed instrumental track of song B to the first recombination stage. In other words, operation of the instrumental swap button 26-10 swaps the two decomposed instrumental tracks of songs A and B before they enter the first and second recombination stages, respectively. Repeated operation of the instrumental swap button 26-10 may again swap the two decomposed instrumental tracks and so on.

Preferably, upon operation of one of the buttons 26-9 or 26-10 by the user, the respective swapping of the tracks will not be immediate, but the device is controlled to continuously or stepwise increase or decrease the respective volumes of the tracks within a certain time period of preferably more than 5 milliseconds or even more than 50 milliseconds, such as to avoid acoustic artefacts arising from instant signal transitions.

Alternatively the vocal swap button 26-9 can be controlled by the user to achieve a similar remix/mashup by obtaining a first recombination A' by recombining the decomposed vocal track of song A at normal volume (in particular maximum volume) with the muted decomposed instrumental track of song A, and by obtaining a second recombination B' by recombining the muted decomposed vocal track of song B with the decomposed instrumental track of song B at normal volume (in particular maximum volume), while setting the mix control element 28 to its center position such as to have recombinations A' and B' both audible at the same volume levels and at the same time.

Figure 11:
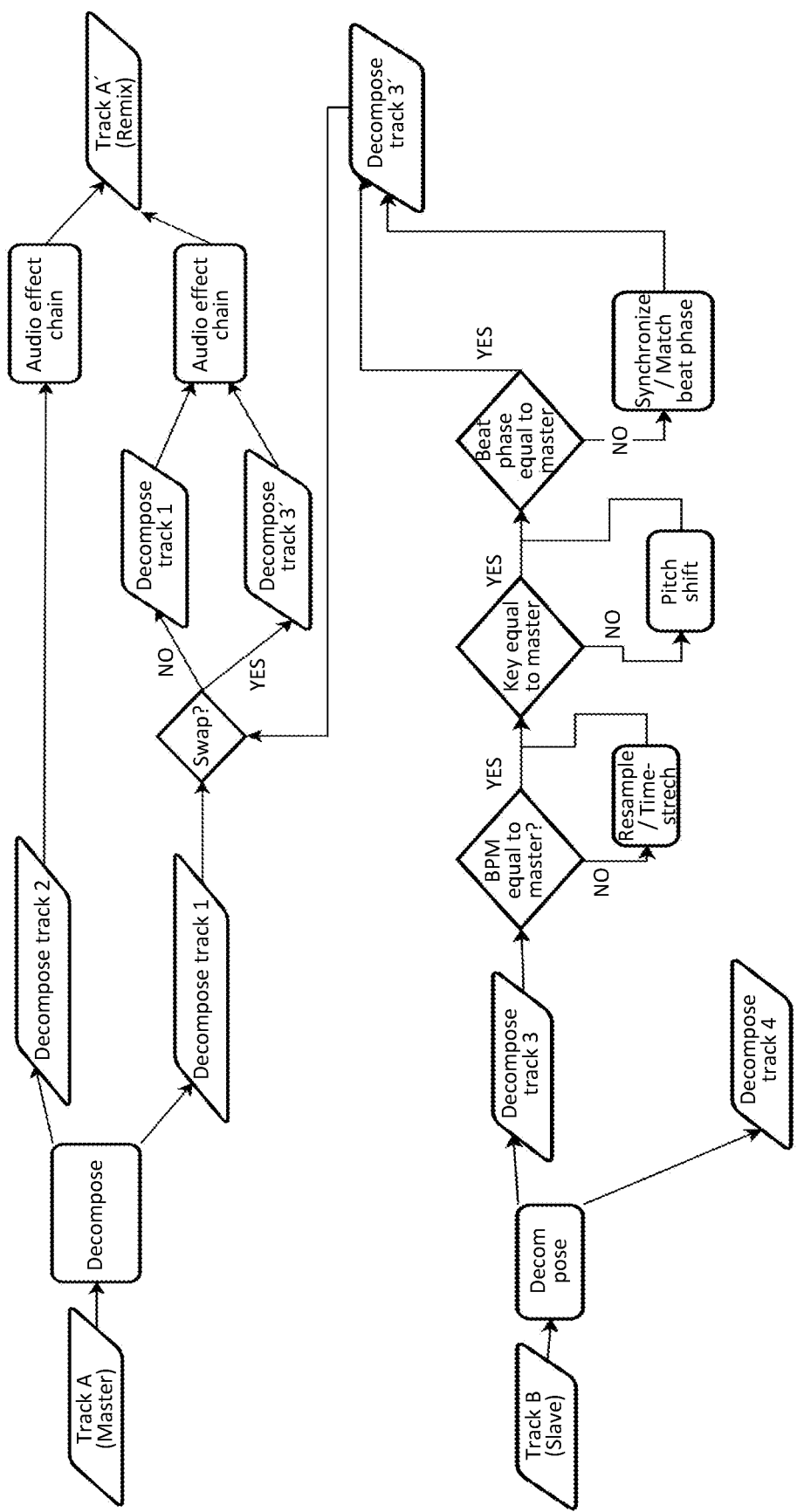
FIG. 11 shows a diagram illustrating a swap process applicable in a device of the eighth embodiment of the invention.

FIG. 11 shows a modification of the method of the eighth embodiment, especially as regards the operation of the swap buttons, for example the vocal swap button 26-9. Device 10 receives a track A (song A) as a master track and track B (song B) as a slave track. Track A is decomposed as described above to obtain decomposed tracks 1 and 2, whereas track B is decomposed as described above to obtain decomposed tracks 3 and 4, respectively. In order to prepare decomposed track 3 for the swap, its key, tempo and beat phase will be matched to that of the master track A. In particular, the device 10 determines a tempo (e.g. a BPM value (beats per minutes)) of track A and track B and if they don't match, decomposed track 3 will be resampled or time-stretched such as to match the tempo of the master track A. In addition, key matching will be carried out and the key of decomposed track 3 will be changed, if necessary, such as to match that of the master track A. Moreover, after tempo matching of decomposed track 3, the beat phase of decomposed track 3 is shifted in a synchronization step as necessary, such as to match the beat phase of track A.

As a result, device 10 prepares a modified decomposed track 3' which matches track A as regards tempo, beat phase and key such that it can be seamlessly recombined with decomposed track 2 of track A. If the swap button is activated, as can be seen in FIG. 11, in the following processing of track A, decomposed track 3' will be used instead of decomposed track 1 and will be routed to the recombination stage for recombination with decomposed track 2 and audio output.

Optionally, one or more audio effect chains may be inserted in the signal flow of any of the tracks, for example between the swapping step and the recombination stage such as to be applied to the respective decomposed tracks 1, 2 or 3', for example.

Figure 12:
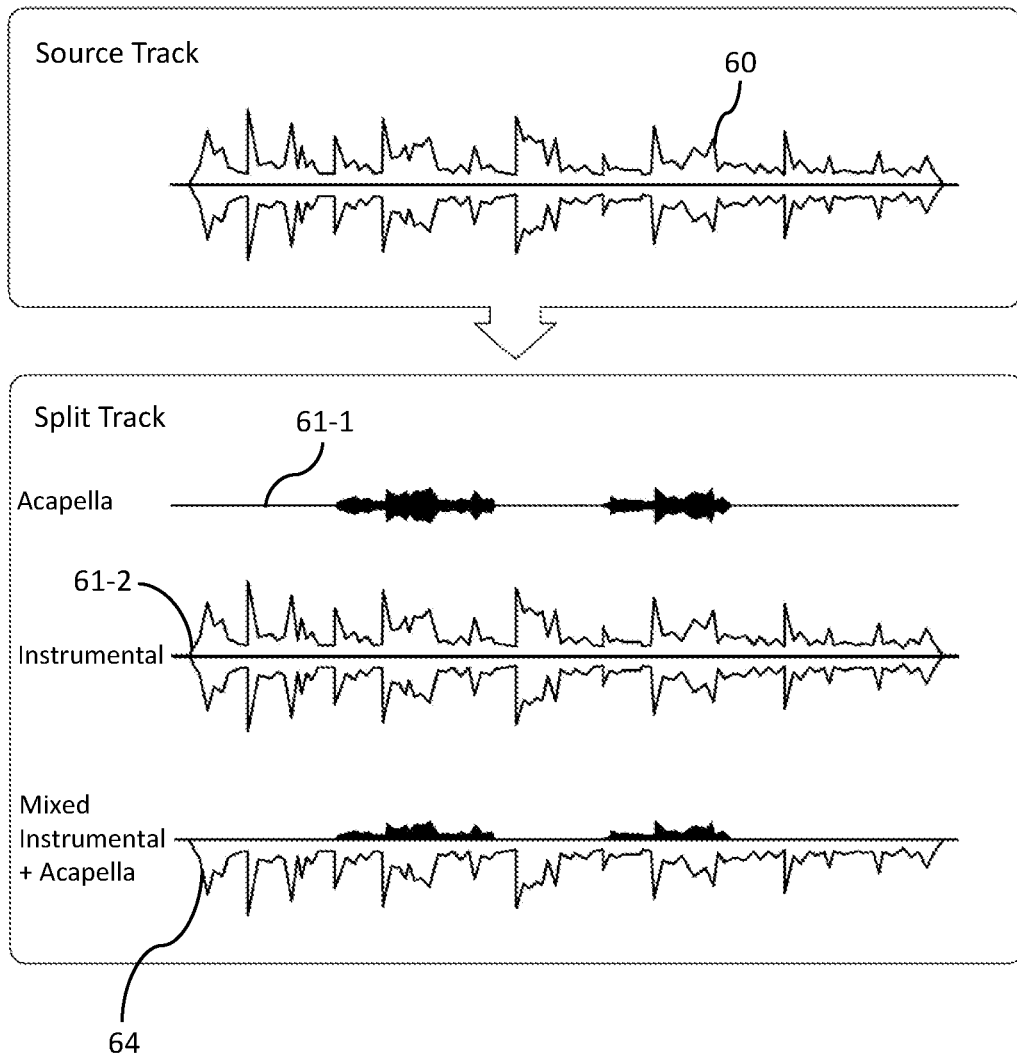
FIGS. 12 and 13 show a graphical representations of waveforms according to embodiments of the invention.
Figure 13:

FIGS. 12 and 13 show graphical representations of audio data which may be displayed on a display device in a method or device of an embodiment of the present invention, in particular in a device according to one of the first to eighth embodiments described above, during operation of the device. In particular, the graphical representation could be displayed on a display of the ECU, in particular a computer screen or on an integrated display of a separate peripheral device connected to a computer or as a standalone device, on a tablet, smartphone or a similar device. The graphical representation may be generated by suitable software which runs on the ECU (i.e. the computer, the standalone device, the tablet, the smartphone etc.) and which may be part of the software that carries out a method according to the present invention as described in the claims or in the embodiments above. The software may operate a graphic interface, such as a graphic card.

According to the embodiment, audio data are visualized as waveforms. Waveforms in this sense are representations having a linear time axis t which represents the playback time (usually a horizontal axis), and a signal axis (orthogonal to the time axis t, preferably a vertical axis), which represents an average signal strength or a signal amplitude of the audio data at each specific playback time. A playhead 58 may be provided which indicates the current playing position. During playback of the audio data, the playhead 58 is moving with respect to the waveform along the time axis t by visually moving either the waveform or the playhead or both.

FIG. 12 schematically shows the processing steps to arrive at the novel graphical representation of the invention. Mixed input data 60, for example song A, is received and decomposed to obtain first decomposed track 61-1, for example a decomposed vocal track, and second decomposed track 61-2, for example a decomposed instrumental track. First and second decomposed tracks 61-1 and 61-2 may be complementary tracks such that their sum corresponds to the mixed input data 60.

Actually displayed is then an overlay waveform 64 which is an overlaid representation of the first and second decomposed tracks 61-1, 61-2 using one single baseline for the waveforms of both decomposed tracks, which means that the time axes t of both waveforms are not running parallel to each other in a distance but are identical to form one common line. In order to allow a differentiation between both waveforms, they are displayed using different drawing styles. For example one of the two waveforms of the decomposed tracks may be displayed in a different color than the other waveform. In the example shown in FIG. 12, for one of the waveforms of the decomposed tracks, here the decomposed vocal track 61-1, only positive signal portions are displayed, while negative signal portions are left out, whereas for the waveform of the other of the decomposed tracks, here the decomposed instrumental track 61-2, only negative signal portions are displayed, while positive signal portions are left out. Alternatively the waveforms could be drawn using differently scaled signal axes or by using different drawing styles such as to allow the waveforms to be distinguished from one another. As an example of different drawing styles, one of the waveforms could be drawn as a dashed or a dotted line, or of different color, or of different opacity or transparency or any combination thereof.

In another example shown in FIG. 13 one of the waveforms of the decomposed tracks, here the waveform of the decomposed vocal track 61-1, is displayed with a signal axes scaled differently, here smaller, than that of the waveform of the other decomposed track, here the decomposed instrumental track 61-2. In addition the waveforms may be displayed with different colors.

Waveforms of decomposed tracks are preferably displayed such as to represent the settings of the control elements of the recompose controlling section and/or the settings of the recombination unit such as to provide a feedback to the user about the signal volumes assigned to the respective decomposed tracks. Preferably, at the same time as a user is manipulating one of the control elements to increase or decrease the volume of at least one decomposed track, the associated waveform of this decomposed track is displayed with an increasing or decreasing size with regard to its signal axis, or visually faded in or out. This graphical feedback is preferably immediate, thus with a delay time which is not disturbing or even not recognizable for the user, in particular a delay time below 500 milliseconds, preferably below 35 milliseconds such that it is not noticeable to the eye at a frame rate of 30 frames per second. Such display greatly assists operation of the device during live performance.

Figure 14:
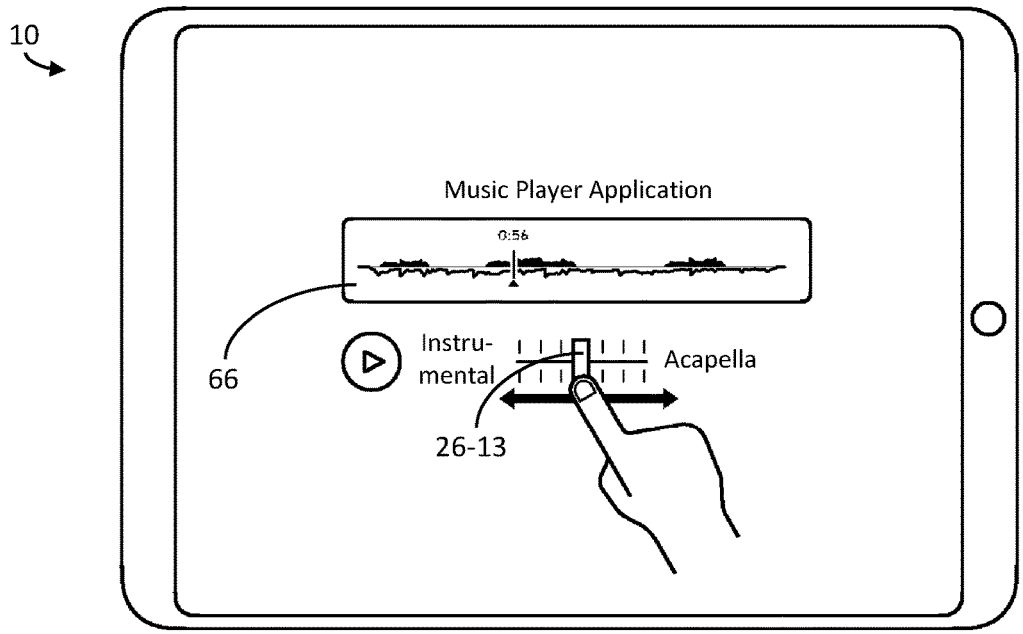
FIG. 14 shows an audio player according to a ninth embodiment of the invention.

FIG. 14 shows a ninth embodiment of a device 10 of the present invention, which is an audio player including a recompose controlling section 24 having a control element 26-13 for controlling the first and second volume levels of respective first and second decomposed tracks (here decomposed vocal track and decomposed instrumental track) obtained from one audio file, and optionally a display region 66 displaying an overlaid representation of the first and second decomposed tracks. The device 10 of FIG. 14 may be adapted to play audio files one after another, for example from a playlist or based on individual user selection, and might have an input unit for receiving audio files via streaming from an audio streaming service, and may thus be adapted to play only one audio file at most of the time (apart from optional crossfading effects at a transition from the end of one song to the beginning of the next song). The user can start or stop playback by operation of a play control element 30 and/or can change the playback position by moving the playhead along the time axis.

Through the control element 26-13 the user may control playback of a song such as to hear only the decomposed vocal track or only the decomposed instrumental track or a recombination of both tracks. Such configuration might be useful for a karaoke application or a play-along application, for example. Preferably, device 10 is a computer or a mobile device, such as a smartphone or tablet, which runs a suitable software application to realize the above-described functionalities.

Figure 15:
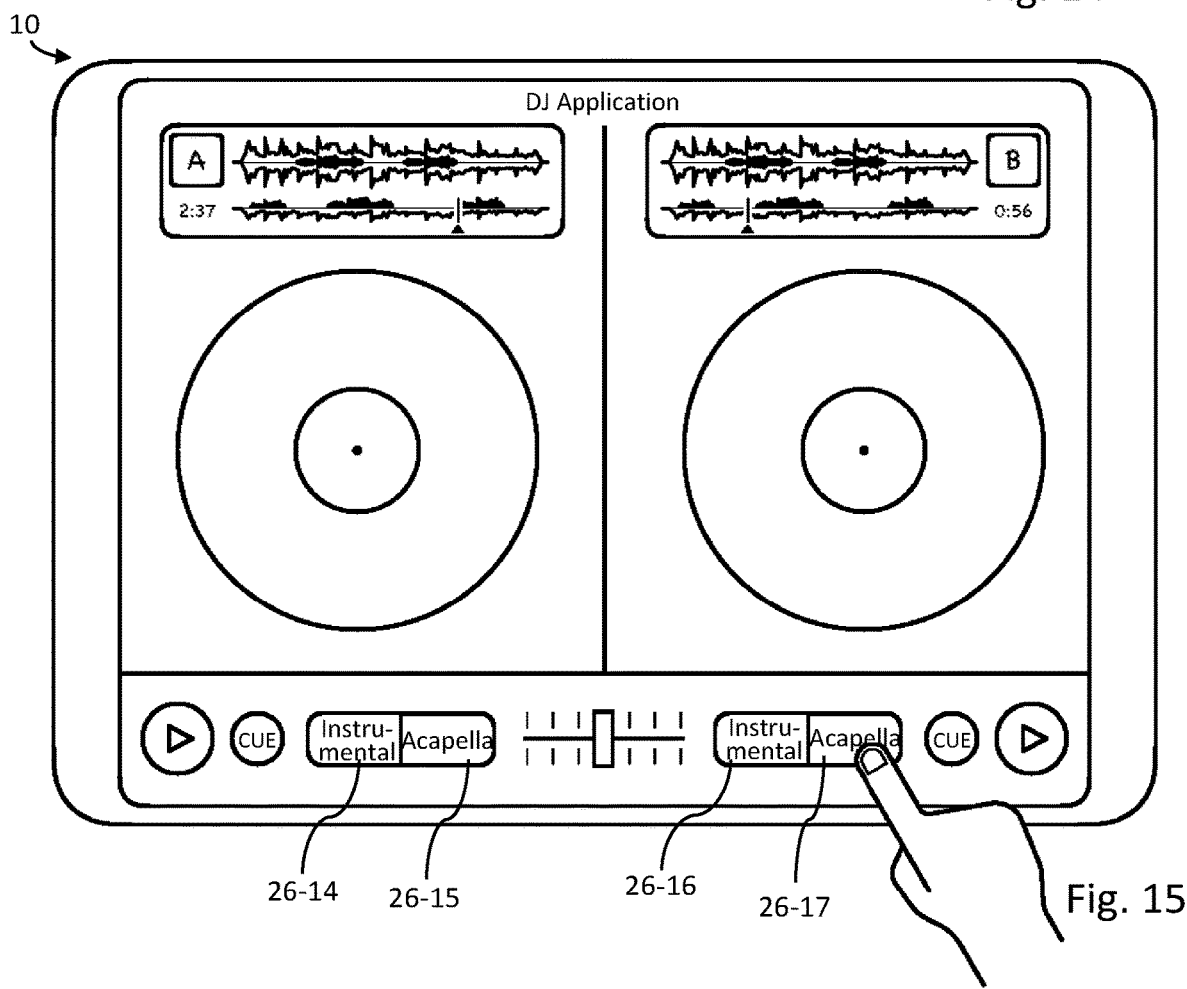
FIGS. 15 to 17 show tenth to twelfth embodiments of the present invention which are each modifications of the first embodiment.

FIG. 15 shows a tenth embodiment of the present invention which comprises separate ON-OFF buttons 26-14 to 26-17 for each of the first to fourth decomposed tracks, in particular the first decomposed vocal track, the first decomposed instrumental track, the second decomposed vocal track and the second decomposed instrumental track, respectively. By operating one of the buttons, the volume of the respective decomposed track is switched between 0 and 100 percent or vice versa.

Figure 16:
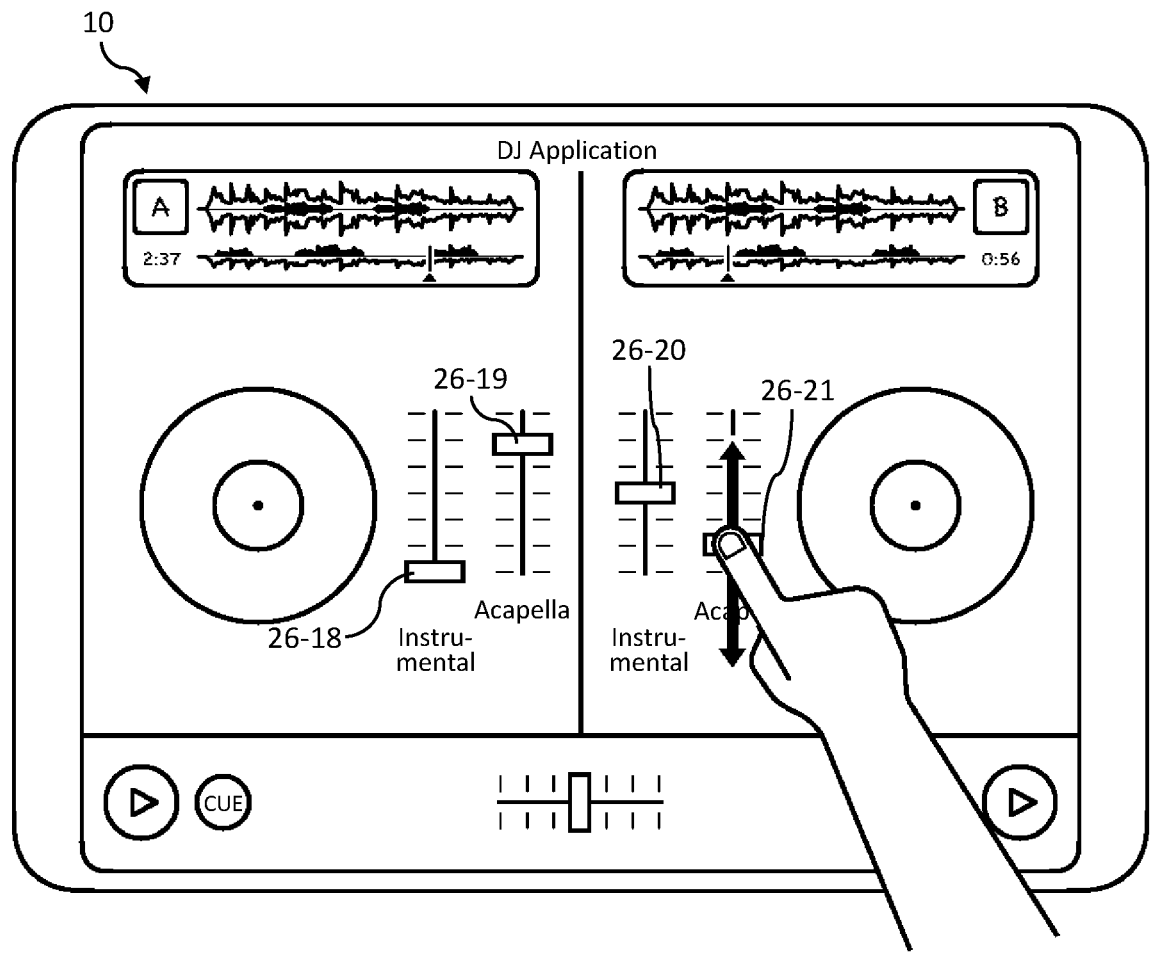

FIG. 16 shows an eleventh embodiment of the present invention which comprises separate faders 26-18 to 26-21 for each of the first to fourth decomposed tracks, in particular the first decomposed vocal track, the first decomposed instrumental track, the second decomposed vocal track and the second decomposed instrumental track, respectively. By operating one of the faders, the volume of the respective decomposed track are continuously changed between 0 and 100 percent or vice versa.

Figure 17:
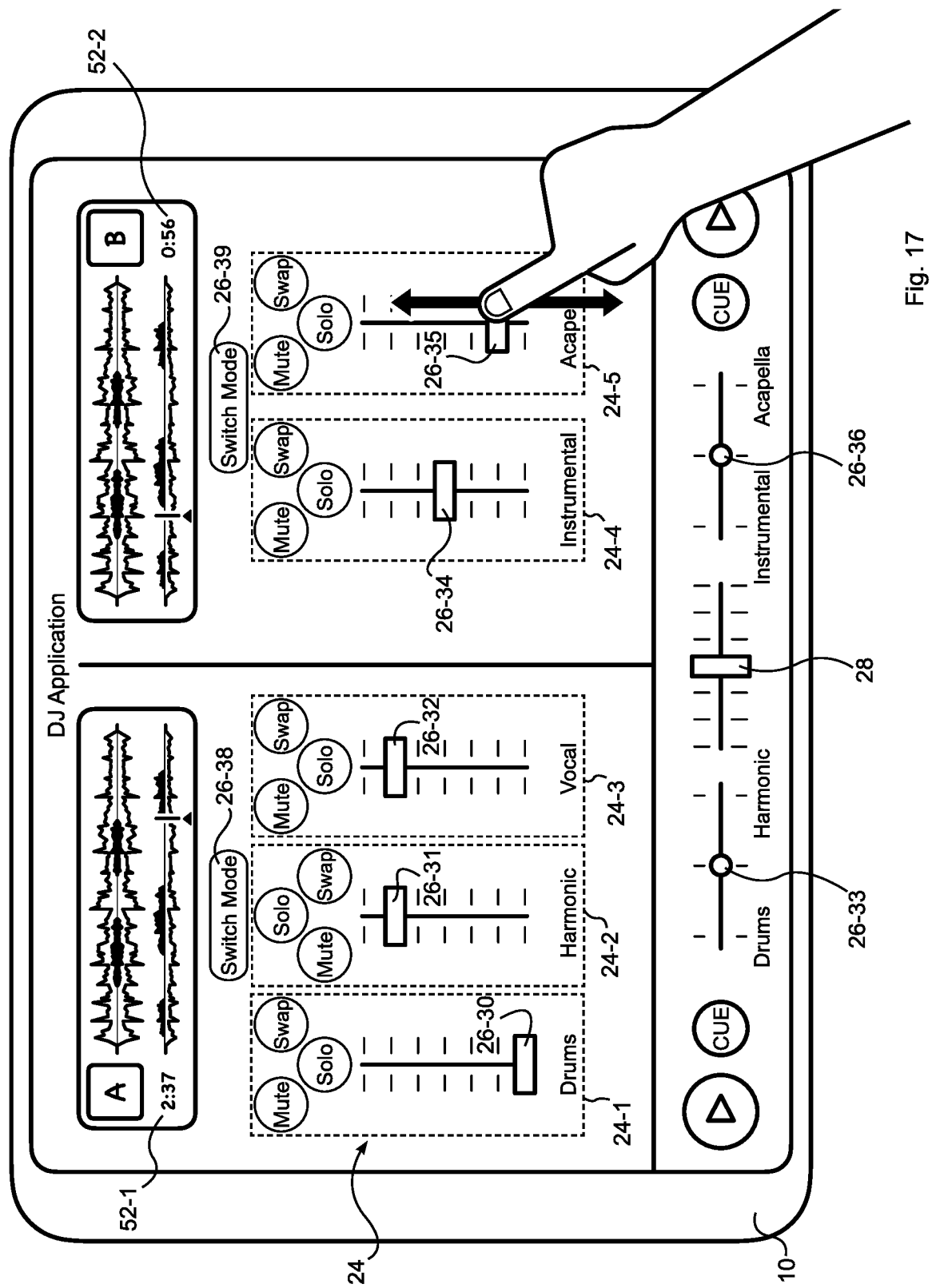

FIG. 17 shows a device according to a twelfth embodiment of the present invention as a further modification of the first embodiment described above with respect to FIGS. 1 to 3, and all features and functions described above for the first embodiment are preferably included in the same or corresponding manner in the twelfth embodiment unless described differently in the following.

Device 10 of the twelfth embodiment includes a first audio input unit receiving audio data of a song A and a second audio input unit receiving audio data of a second song B different from the song A. A first waveform section 52-1 may display a waveform representation of song A and/or a current playhead position within song A, and a second waveform section 52-2 may display a waveform representation of song B and/or a current playhead position within song B.

Furthermore, recompose controlling section 24 may have a plurality of subsections 24-1, 24-2, . . . showing several control elements for controlling several decomposed tracks or groups of decomposed tracks obtained from decomposing the audio data of song A and/or song B. In particular, in the twelfth embodiment, a part of the recompose controlling section 24 associated to song A includes a first subsection 24-1 controlling a decomposed drums track, a second subsection 24-2 controlling a decomposed harmonic track and a third subsection 24-3 controlling a decomposed vocal track. Preferably, these three decomposed tracks (drums, harmonic and vocal) include substantially the complete audio data of song A, which means that they sum up to an audio signal that is equal or substantially equal to the audio signal of song A as received at the first audio input unit.

Each of the subsections 24-1, 24-2, 24-3 may include a respective volume control element 26-30, 26-31, 26-32 which allows to control, preferably continuously control, the volume level of the respective decomposed track. The volume control elements 26-30, 26-31, 26-32 may be embodied as slideable faders for intuitive and precise control. Furthermore, each of the subsections 24-1, 24-2, 24-3 may include a mute button allowing to mute/unmute or switch off/on the respective decomposed track by simply pushing the button. Furthermore, each of the subsections 24-1, 24-2, 24-3 may include a solo button which allows to switch the respective decomposed track into a solo mode by switching off or muting all of the other decomposed tracks of song A.

Furthermore, each of the subsections 24-1, 24-2, 24-3 may include a swap button which, when operated, allows to swap the respective decomposed track of song A with a decomposed track of song B that is assigned to this track. In particular, the device 10 may be configured to have swap pairs of predetermined decomposed tracks of song A and song B such that, upon operation of the swap button, the respective subsection will no longer control the decomposed track of song A originally designed to that subsection, but instead its assigned counterpart decomposed track of song B. Another operation of the swap button will reverse this swapping operation such that the subsection will again control the originally assigned decomposed track of song A.

Another control element 26-33 may be associated to song A and may be adapted to control a cross-fade between two of the decomposed tracks or groups of decomposed tracks of song A. In the present embodiment, control element 26-33, which may be embodied as a slider, is provided to fade between the decomposed drum track and the decomposed harmonic track in order to allow an easy change of the characteristics of the accompaniment of song A.

Device 10 may include a feature to allow a user to change the selection of decomposed tracks that can be controlled at the recompose controlling section 24. For example, the device 10 may be switched to different modes, for example by operation of a switch mode button 26-38 or 26-39, which may result in a change of the number of decomposed tracks to be controlled, i.e. the number of subsections 24-1, 24-2 . . . , and/or a change of the selection of decomposed tracks itself (for example drums, harmonic, vocal, instrumental, etc.). In the example shown in the twelfth embodiment in FIG. 17, the part of the recompose controlling section 24 associated to song B is set into a mode in which only two decomposed tracks, for example an instrumental track and a vocal track, are displayed and can be controlled by control elements in respective control sections 24-4 and 24-5. Upon operation of the switch mode button 26-39, the control mode may be switched to another mode, for example to the mode shown in FIG. 17 for song A, e.g. a mode allowing control of three decomposed tracks (for example drums, harmonic and vocal). In this way, the recompose controlling section 24 may easily be adapted to either a type of music received as song A or song B (for example vocal music or electronic music) or to a preference of the DJ as regards complexity of control and creative freedom.

It should be noted that an additional control element 26-36 may be provided for song B similar to the cross-fader 26-33 provided for song A, wherein control element 26-36 allows cross-fading between the two decomposed tracks or groups of decomposed tracks selected for song B. Furthermore, each of the subsections 24-4, 24-5 associated to song B may again comprise a mute button, and/or a solo button and/or a swap button with functionality corresponding to those described above for subsections 24-1, 24-2, 24-3 of song A.

Furthermore, device 10 may include a mix control element 28 allowing to control a mix between the sum of all decomposed tracks associated to song A on the one hand, and the sum of all decomposed tracks associated to song B on the other hand, wherein each sum takes into account the respective volume, mute or solo settings associated to the respective decomposed track or group of decomposed tracks.

The invention claimed is:

1. A method for processing and playing audio data, comprising the steps of:
    receiving mixed input data, the mixed input data being a sum signal obtained from mixing at least one first source track with at least one second source track;
    decomposing the mixed input data to obtain at least a first decomposed track resembling the at least one first source track;
    generating output data based on the first decomposed track; and
    playing the output data through an audio output,
    wherein the mixed input data are processed within a first AI system and a second AI system separate from the first AI system, wherein the first AI system processes the mixed input data to obtain only the first decomposed track and the second AI system processes the mixed input data to obtain only a second decomposed track.

2. The method of claim 1, further comprising the following steps:
    reading a control input from a user, the control input representing a desired setting of a first volume level of the first decomposed track and a second volume level of a second track;
    recombining at least the first decomposed track at the first volume level with the second track at the second volume level to generate recombined output data; and
    playing the recombined output data.

3. The method of claim 2, wherein the second track is obtained in the step of decomposing the mixed input data and forms a second decomposed track resembling the at least one second source track.

4. The method of claim 1, wherein the receiving, decomposing, generating and playing steps are carried out in a continuous process.

5. The method of claim 1, wherein the mixed input data are received via streaming from a remote server.

6. The method of claim 1, wherein at least one of the mixed input data or the first decomposed track represent stereo signals, each comprising a left-channel signal portion and a right-channel signal portion, respectively.

7. The method of claim 1, wherein decomposing the mixed input data includes processing the mixed input data by an AI system, the AI system trained by a plurality of sets of training audio data, wherein each set of training audio data at least includes a first source track and a mixed track being a sum signal obtained from mixing at least the first source track or a track that resembles the first source track, with a second source track.

8. A method for processing and playing audio data, comprising the steps of:
    receiving mixed input data, the mixed input data being a sum signal obtained from mixing at least one first source track with at least one second source track;
    decomposing the mixed input data to obtain at least a first decomposed track resembling the at least one first source track;
    generating output data based on the first decomposed track; and
    playing the output data through an audio output,
    wherein decomposing the mixed input data is carried out segment-wise;
    wherein decomposing the mixed input data is carried out based on a first segment of the mixed input data such as to obtain a first segment of output data; and
    wherein decomposing the mixed input data of a second segment of the mixed input data is carried out while playing the first segment of output data.

9. A method for processing and playing audio data, comprising the steps of:
    receiving mixed input data, the mixed input data being a sum signal obtained from mixing at least one first source track with at least one second source track, wherein receiving the mixed input data comprises:
        receiving an input audio file having a predetermined file size and a predetermined playback duration is received, wherein the input audio file contains first audio data to play the mixed input data,
        extracting a first segment of the input audio file, wherein the first segment of the input audio file contains second audio data to play the mixed input data within a first time interval smaller than the predetermined playback duration; and
        extracting a second segment of the input audio file, which is different from the first segment of the input audio file and which contains third audio data to play the mixed input data within a second time interval smaller than the predetermined playback duration of the input audio file and shifted in time with respect to the first time interval;
    decomposing the mixed input data to obtain at least a first decomposed track resembling the at least one first source track, wherein decomposing the mixed input data to obtain at least a first decomposed track comprises decomposing the first segment of the input audio file to obtain a first segment of the first decomposed track;
    decomposing the second segment of the input audio file to obtain a second segment of the first decomposed track;
    generating output data based on the first decomposed track, wherein generating output data based on the first decomposed track comprises generating a first segment of the output data from the first segment of the first decomposed track; and
    playing the output data through an audio output.

10. A method for processing and playing audio data, comprising the steps of:
    receiving mixed input data, the mixed input data being a sum signal obtained from mixing at least one first source track with at least one second source track, wherein receiving the mixed input data comprises:
        receiving an input audio file having a predetermined file size and a predetermined playback duration is received, wherein the input audio file contains first audio data to play the mixed input data;
        extracting a first segment of the input audio file, wherein the first segment of the input audio file contains second audio data to play the mixed input data within a first time interval smaller than the predetermined playback duration; and extracting a second segment of the input audio file, which is different from the first segment of the input audio file and which contains third audio data to play the mixed input data within a second time interval smaller than the predetermined playback duration of the input audio file and shifted in time with respect to the first time interval;

decomposing the mixed input data to obtain at least a first decomposed track resembling the at least one first source track, wherein decomposing the mixed input data to obtain at least a first decomposed track comprises decomposing the first segment of the input audio file to obtain a first segment of the first decomposed track, wherein a size of the first segment of the input audio file or a length of the first time interval is set such that the time required for decomposing the first segment of the input audio file is smaller than two (2) seconds;

decomposing the second segment of the input audio file to obtain a second segment of the first decomposed track;

generating output data based on the first decomposed track, wherein generating output data based on the first decomposed track comprises generating a first segment of the output data from the first segment of the first decomposed track; and playing the output data through an audio output.

11. A method for processing and playing audio data, comprising the steps of:

receiving mixed input data, the mixed input data being a sum signal obtained from mixing at least one first source track with at least one second source track;

decomposing the mixed input data to obtain at least a first decomposed track resembling the at least one first source track;

generating output data based on the first decomposed track;

receiving an input audio file having a predetermined file size and a predetermined playback duration, which contains first audio data to play the mixed input data;

partitioning the input audio file into a plurality of consecutive segments of the input audio file, wherein the segments of the input audio file contain audio data to play the mixed input data within a plurality of consecutive time intervals;

receiving a play position command from a user representing a user's command to play the input audio file from a certain start play position;

identifying a first segment of the input audio file of the plurality of segments of the input audio file such that the start play position is within the time interval which corresponds to the first segment of the input audio file;

decomposing the first segment of the input audio file to obtain a first segment of the first decomposed tracks;

generating a first segment of the output data based on the first segment of the first decomposed track; and playing the output data through an audio output, including playing the first segment of the output data starting at the start play position, wherein the start play position is later than or equal to a start of the time interval of the first segment of the output data.

12. A method for processing and playing audio data, comprising the steps of:

receiving mixed input data, the mixed input data being a sum signal obtained from mixing at least one first source track with at least one second source track;

decomposing the mixed input data to obtain at least a first decomposed track resembling the at least one first source track;

generating output data based on the first decomposed track;

wherein the mixed input data are first mixed input data being a sum signal obtained from mixing at least a first source track with a second source track and wherein the method further comprises the steps of:

receiving second mixed input data, the second mixed input data being a sum signal obtained from mixing at least one third source track with at least one fourth source track;

decomposing the second mixed input data to obtain a third decomposed track resembling the at least one third source track, and a fourth decomposed track resembling the at least one fourth source track, wherein a control input represents a desired setting of a first volume level of the first decomposed track, a second volume level of a second decomposed track, a third volume level of the third decomposed track, and a fourth volume level of the fourth decomposed track; and wherein recombined output data is generated by recombining the first decomposed track at the first volume level, the second decomposed track at the second volume level, the third decomposed track at the third volume level and the fourth decomposed track at the fourth volume level; and playing the recombined output data through an audio output.

13. A method for processing and playing audio data, comprising the steps of:

receiving mixed input data, the mixed input data being a sum signal obtained from mixing at least one first source track with at least one second source track, wherein the mixed input data are first mixed input data based on a periodic beat structure;

decomposing the mixed input data to obtain at least a first decomposed track resembling the at least one first source track;

generating output data based on the first decomposed track;

playing the output data through an audio output;

receiving second mixed input data different from the first mixed input data and having a periodic beat signal;

performing at least one of a tempo matching processing or a key matching processing, wherein the tempo matching processing comprises:
receiving first input data obtained from the first mixed input data and second input data obtained from the second mixed input data;
time stretching or resampling of at least one of the first input data and the second input data; and
outputting first output data and second output data which have mutually matching tempos; and wherein the key matching processing comprises:
receiving the first input data obtained from the first mixed input data and the second input data obtained from the second mixed input data;
pitch shifting of at least one of the first input data or the second input data; and
outputting the first output data and the second output data which have mutually matching keys.

14. A device for processing and playing audio data, comprising:

an audio input unit for receiving mixed input data, the mixed input data being a sum signal obtained from mixing at least a first source track with at least a second source track;
a decomposing unit connected to the audio input unit for decomposing the mixed input data to obtain at least a first decomposed track resembling the first source track; and
a playing unit for playing output data based on the first decomposed track, wherein the audio input unit is a first audio input unit for receiving first mixed input data based on a periodic beat structure, and wherein the device further comprises:
a second audio input unit for receiving second mixed input data (B) different from the first mixed input data (A) and based on a periodic beat signal; and
at least one of a tempo matching unit or a key matching unit,
 wherein the tempo matching unit is arranged to receive a first input data obtained from the first mixed input data and second input data obtained from the second mixed input data,
 wherein the tempo matching unit comprises a time stretching unit adapted to time stretch at least one of the first input data and the second input data, and to output first output data and second output data which have mutually matching tempos, and
 wherein the key matching unit is arranged to receive the first input data obtained from the first mixed input data and the second input data obtained from the second mixed input data, and wherein the key matching unit comprises a pitch shifting unit adapted to pitch shift at least one of the first input data and the second input data, and to output the first output data and the second output data which have mutually matching keys.

15. The device of claim 14, further comprising a recombination unit for recombining at least the first decomposed track with a second track to generate the output data for the playing unit.

16. The device of claim 15, further comprising a recompose controlling section adapted to be controlled by a user to generate a control input representing a desired setting of a first volume level of the first decomposed track and a second volume level of the second track, wherein the recombination unit is configured to recombine at least the first decomposed track at the first volume level with the second track at the second volume level to generate the output data.

17. The device of claim 16, wherein the recompose controlling section comprises at least one recompose control element which is operable by a user in a single control operation for controlling the first volume level and the second volume level, while at the same time decreasing the other one of the first volume level and the second volume level.

18. The device of claim 14, wherein the audio input unit, the decomposing unit and the playing unit are integrated within a single unit.

19. A device for processing and playing audio data, comprising:
an audio input unit for receiving mixed input data, the mixed input data being a sum signal obtained from mixing at least a first source track with at least a second source track, wherein the audio input unit is a first audio input unit for receiving first mixed input data being a sum signal obtained from mixing at least a first source track with a second source track,
a first decomposing unit connected to the audio input unit for decomposing the mixed input data to obtain at least a first decomposed track resembling the first source track;
a second audio input unit for receiving second mixed input data, the second mixed input data being a sum signal obtained from mixing at least a third source track with a fourth source track;
a second decomposing unit connected to the second audio input unit for decomposing the second mixed input data to obtain a third decomposed track resembling the third source track and a fourth decomposed track resembling the fourth source track;
a recompose controlling section adapted to be controlled by a user to generate a control input representing a desired setting of a first volume level of the first decomposed track, a second volume level of a second track, a third volume level of the third decomposed track, and a fourth volume level of the fourth decomposed track and
a playing unit for playing recombined output data;
a recombination unit for recombining at least the first decomposed track with the second track to generate recombined output data for the playing unit, wherein the recombination unit is adapted to generate the recombined output data by recombining the first decomposed track at the first volume level, the second track at the second volume level, the third decomposed track at the third volume level and the fourth decomposed track at the fourth volume level.

20. A device for processing and playing audio data, comprising:
an audio input unit for receiving mixed input data, the mixed input data being a sum signal obtained from mixing at least a first source track with at least a second source track;
a decomposing unit connected to the audio input unit for decomposing the mixed input data to obtain at least a first decomposed track resembling the first source track; and
a playing unit for playing output data based on the first decomposed track;
a recombination unit for recombining at least the first decomposed track with a second track to generate the output data for the playing unit;
a recompose controlling section adapted to be controlled by a user to generate a control input representing a desired setting of a first volume level of the first decomposed track and a second volume level of the second track, wherein the recombination unit is configured to recombine at least the first decomposed track at the first volume level with the second track at the second volume level to generate the output data, wherein the recompose controlling section comprises:
 a first recompose control element which is operable by a user in a single control operation for controlling the first volume level and the second volume level, while at the same time decreasing the other one of the first volume level and the second volume level; and
 a mix control element, which is operable by the user in a single control operation for controlling a first sum signal and a second sum signal, while at the same time decreasing the other one of the first sum signal and the second sum signal, the first sum signal being a sum of the first decomposed track at the first volume level and the second track at the second volume level and the second sum signal being a sum of a third decomposed track at a third volume level and a fourth decomposed track at a fourth volume level.

21. A device for processing and playing audio data, comprising:
   an audio input unit for receiving mixed input data, the mixed input data being a sum signal obtained from mixing at least a first source track with at least a second source track;
   a decomposing unit connected to the audio input unit for decomposing the mixed input data to obtain at least a first decomposed track resembling the first source track; and
   an input audio file buffer for loading therein segments of an input audio file having a predetermined file size and a predetermined playback duration, wherein the input audio file contains audio data to play the mixed input data;
   a first segment buffer connected to the decomposing unit to receive and store a segment of the first decomposed track obtained from a segment of the input audio file;
   a second segment buffer connected to the decomposing unit to receive and store a segment of a second decomposed track obtained from the segment of the input audio file;
   a playing unit for playing output data based on the first decomposed track, wherein the playing unit comprises an audio interface having an analog-to-digital converter to generate an analog audio signal from recombined output data, the audio interface having an audio buffer for buffering portions of the output data for playing; and
   wherein a size of at least one of the first segment buffer or the second segment buffer is larger than a size of the audio buffer of the audio interface, but smaller than the input audio file or the predetermined file size of the input audio file.

22. A method for representing audio data, the audio data comprising at least a first track and a second track, wherein the first track and the second track are components of a joint audio mix, and wherein the method comprises:
   displaying a first waveform representative of the first track; and
   displaying a second waveform representative of the second track, wherein the first waveform and the second waveform are displayed in an overlaid manner using one single baseline, and wherein the first waveform and the second waveform are displayed using at least one of different signal axes or different drawing styles such as to be visually distinguishable from one another, wherein at least one of the first waveform or the second waveform is displayed by rendering the at least one of the first waveform or the second waveform in a predetermined time interval with a color that depends on a frequency information of the respective track within the predetermined time interval.

23. The method of claim 22, wherein the first waveform is displayed using a first drawing style which draws signal portions of the first waveform primarily or exclusively in a positive region relative to a baseline, and wherein the second waveform is displayed using a second drawing style which draws signal portions of the second waveform primarily or exclusively in a negative region relative to the same baseline.

24. A method for representing audio data, the audio data comprising at least a first track and a second track, wherein the first track and the second track are components of a joint audio mix, and wherein the method comprises:
   displaying a first waveform representative of the first track; and
   displaying a second waveform representative of the second track, wherein the first waveform and the second waveform are displayed in an overlaid manner using one single baseline, and wherein the first waveform and the second waveform are displayed using at least one of different signal axes or different drawing styles such as to be visually distinguishable from one another,
   wherein the first and second waveforms are displayed using first and second drawing styles which both draw primarily or exclusively a positive signal portion or which both draw primarily or exclusively a negative signal portion, and wherein the first waveform is displayed using a first signal axis and the second waveform is displayed using a second signal axis that runs opposite to the first signal axis.

25. A method for representing audio data, the audio data comprising at least a first track and a second track, wherein the first track and the second track are components of a joint audio mix, and wherein the method comprises:
   receiving mixed input data, the mixed input data being a sum signal obtained from mixing at least one first source track with at least one second source track:
   decomposing the mixed input data to obtain at least a first decomposed track resembling the at least one first source track, and a second decomposed track resembling the at least one second source track;
   reading a control input from a user, the control input representing a desired setting of a first volume level of the first decomposed track and a second volume level of the second decomposed track;
   displaying a first waveform representative of the first decomposed track and displaying a second waveform representative of the second decomposed track,
     wherein the first waveform representative of the first decomposed track and the second waveform representative of the second decomposed track are displayed in an overlaid manner using one single baseline,
   wherein the waveforms are displayed using at least one of different signal axes or different drawing styles such as to be visually distinguishable from one another, and
     wherein the first waveform representative of the first decomposed track is displayed with its signal axis being scaled or its appearance being modified depending on the first volume level, wherein the second waveform representative of the second decomposed track is displayed with its signal axis being scaled or its appearance being modified depending on the second volume level.

26. A method for representing audio data, the audio data comprising at least a first track and a second track, wherein the first track and the second track are components of a joint audio mix, and wherein the method comprises:
   receiving mixed input data, the mixed input data being a sum signal obtained from mixing at least one first source track with at least one second source track;
   decomposing the mixed input data to obtain at least a first decomposed track resembling the at least one first source track, and a second decomposed track resembling the at least one second source track;

reading a control input from a user, the control input representing a desired setting of a first volume level of the first decomposed track and a second volume level of the second decomposed track;

displaying a first waveform representative of the first decomposed track and displaying a second waveform representative of the second decomposed track, wherein the first waveform representative of the first decomposed track and the second waveform representative of the second decomposed track are displayed in an overlaid manner using one single baseline, wherein the waveforms are displayed using at least one of different signal axes or different drawing styles such as to be visually distinguishable from one another, wherein the first waveform representative of the first decomposed track is displayed with its signal axis being scaled or its appearance being modified depending on the first volume level, wherein the second waveform representative of the second decomposed track is displayed with its signal axis being scaled or its appearance being modified depending on the second volume level, and wherein the first waveform representative of the first decomposed track and second waveform representative of the second decomposed track are displayed with their signal axes being scaled on the basis of current values of the first volume level and the second volume level within a time period of not more than two (2) seconds.

27. A device for processing and playing audio data:

a processing unit for processing audio data of at least a first track and a second track:

a controlling section adapted to be controlled by a user to generate a control input representing a desired setting of a first volume level of the first track and a second volume level of the second track:

a recombination/mixing unit configured to combine the first track at a first volume level with the second track at a second volume level to generate output data:

a visualization unit configured to generate waveform data for visualizing at least one waveform based on the first track, the second track and the control input, wherein the visualization unit is configured to calculate a combination track representing a combination of at least the first track at the first volume level and the second track at the second volume level, and to generate the waveform data such as to visualize the waveform of the combination track; and a playing unit for playing audio data based on the output data.

28. The device of claim 27, wherein the visualization unit is configured to generate at least one of a first waveform based on the first track or a second waveform based on the second track, wherein a scaling of a signal axis or a drawing style of the first waveform is set depending on the first volume level, and wherein a scaling of a signal axis or a drawing style of the second waveform is set depending on the second volume level.

29. The device of claim 27, wherein the visualization unit is configured to generate the waveform data for visualizing a first waveform based on the first track and the control input, and a second waveform based on the second track and the control input, and wherein the waveform data are generated such as to display the first waveform and the second waveform in an overlaid manner using one baseline, but at least one of different signal axes or different drawing styles such as to be visually distinguishable from one another.

30. The device of claim 27, wherein the first track is a first decomposed track and the second track is a second decomposed track.

31. A device for processing and playing audio data, comprising:

a processing unit for processing audio data of at least a first track and a second track;

a controlling section adapted to be controlled by a user to generate a control input representing a desired setting of a first volume level of the first track and a second volume level of the second track;

a recombination/mixing unit configured to combine the first track at a first volume level with the second track at a second volume level to generate output data;

a visualization unit configured to generate waveform data for visualizing at least one waveform based on the first track, the second track and the control input, wherein the device is configured to allow the waveform data based on a particular control input to be generated and displayed on the visualization unit within a time period of not more than two (2) seconds after the particular control input is generated by the user.

32. A device for processing and playing audio data, comprising:

an audio input unit for receiving mixed input data, said mixed input data being a sum signal obtained from mixing a vocal component, a drum component and a harmonic component;

a decomposing unit connected to the audio input unit for decomposing the mixed input data to obtain a first decomposed track resembling the vocal component, a second decomposed track resembling the drum component, and a third decomposed track resembling the harmonic component;

a recompose controlling section adapted to be controlled by a user and including a first control element for controlling a first volume level of the first decomposed track, a second control element for controlling a second volume level of the second decomposed track, and a third control element for controlling a third volume level of the third decomposed track;

a recombination unit adapted to generate output data by recombining the first decomposed track at the first volume level, the second decomposed track at the second volume level, and the third decomposed track at the third volume level; and a playing unit for playing the output data.

* * * * *